(12) United States Patent  
Rao

(10) Patent No.: US 9,392,429 B2
(45) Date of Patent: Jul. 12, 2016

(54) MOBILE DEVICE AND SYSTEM FOR MULTI-STEP ACTIVITIES

(71) Applicant: QUALTRICS, LLC, Provo, UT (US)

(72) Inventor: Bindu Rama Rao, Laguna Niguel, CA (US)

(73) Assignee: QUALTRICS, LLC, Provo, UT (US)

( * ) Notice: Subject to any disclaimer, the term of this patent is extended or adjusted under 35 U.S.C. 154(b) by 0 days.

(21) Appl. No.: 14/147,600

(22) Filed: Jan. 6, 2014

(65) Prior Publication Data

US 2014/0120868 A1 May 1, 2014

Related U.S. Application Data

(63) Continuation of application No. 11/881,195, filed on Jul. 25, 2007, now Pat. No. 8,700,014.

(60) Provisional application No. 60/860,700, filed on Nov. 22, 2006.

(51) Int. Cl.
*H04W 4/18* (2009.01)
*G06F 17/30* (2006.01)

(52) U.S. Cl.
CPC .......... *H04W 4/18* (2013.01); *G06F 17/30775* (2013.01); *G06F 17/30905* (2013.01)

(58) Field of Classification Search
CPC ............... H04W 4/18; G06F 17/30905; G06F 17/30775
See application file for complete search history.

(56) References Cited

U.S. PATENT DOCUMENTS

| | | |
|---|---|---|
| 3,647,926 A | 3/1972 | Rohloff et al. |
| 5,036,389 A | 7/1991 | Morales |
| 5,680,305 A | 10/1997 | Apgar, IV |
| 5,740,035 A | 4/1998 | Cohen et al. |
| 5,801,754 A | 9/1998 | Ruybal et al. |
| 5,805,821 A | 9/1998 | Saxena |
| 5,838,314 A | 11/1998 | Neel et al. |
| 5,862,223 A | 1/1999 | Walker et al. |
| 5,870,454 A | 2/1999 | Dahlen |
| 5,873,068 A | 2/1999 | Beaumont et al. |
| 5,905,974 A | 5/1999 | Fraser et al. |
| 5,915,243 A | 6/1999 | Smolen |
| 5,970,473 A | 10/1999 | Gerszberg et al. |
| 6,057,872 A | 5/2000 | Candelore |
| 6,161,458 A | 12/2000 | Spatafora |
| 6,175,822 B1 | 1/2001 | Jones |

(Continued)

FOREIGN PATENT DOCUMENTS

WO    WO 2006/051858    5/2006

OTHER PUBLICATIONS

U.S. Appl. No. 14/985,330, filed Dec. 30, 2015, Rao.

(Continued)

*Primary Examiner* — Marcos Torres
(74) *Attorney, Agent, or Firm* — Keller Jolley Preece

(57) ABSTRACT

An multistep guided system for mobile devices that facilitates the creation and dissemination of multistep guided activities from a source computer/device to a plurality of other recipient mobile devices, wherein the multistep guided activities is disseminated to the recipient mobile devices in a form that is compatible with the capabilities of the respective recipient mobile devices. The audio guided system comprises the source computer/device, the plurality of other recipient mobile devices and a server.

18 Claims, 12 Drawing Sheets

(56) References Cited

U.S. PATENT DOCUMENTS

| | | |
|---|---|---|
| 6,189,029 B1 | 2/2001 | Fuerst |
| 6,267,379 B1 | 7/2001 | Forrest et al. |
| 6,282,713 B1 | 8/2001 | Kitsukawa et al. |
| 6,302,698 B1 | 10/2001 | Ziv-El |
| 6,430,624 B1 | 8/2002 | Jamtgaard et al. |
| 6,477,504 B1 | 11/2002 | Hamlin et al. |
| 6,501,779 B1 | 12/2002 | McLaughlin et al. |
| 6,502,242 B1 | 12/2002 | Howe et al. |
| 6,513,014 B1 | 1/2003 | Walker et al. |
| 6,587,835 B1 | 7/2003 | Treyz et al. |
| 6,631,377 B2 | 10/2003 | Kuzumaki |
| 6,721,713 B1 | 4/2004 | Guheen et al. |
| 6,735,778 B2 | 5/2004 | Khoo et al. |
| 6,801,931 B1 | 10/2004 | Ramesh et al. |
| 6,819,669 B2 | 11/2004 | Rooney |
| 6,873,688 B1 | 3/2005 | Aarnio |
| 6,873,967 B1 | 3/2005 | Kalagnanam et al. |
| 6,907,402 B1 | 6/2005 | Khaitan |
| 6,941,324 B2 | 9/2005 | Plastina et al. |
| 6,973,432 B1 | 12/2005 | Woodard et al. |
| 7,020,685 B1 | 3/2006 | Chen et al. |
| 7,024,381 B1 | 4/2006 | Hastings et al. |
| 7,032,030 B1 | 4/2006 | Codignotto |
| 7,096,464 B1 | 8/2006 | Weinmann |
| 7,107,311 B1 | 9/2006 | Zittrain et al. |
| 7,194,756 B2 | 3/2007 | Addington et al. |
| 7,197,120 B2 * | 3/2007 | Luehrig et al. ............. 379/88.14 |
| 7,222,158 B2 | 5/2007 | Wexelblat |
| 7,261,239 B2 | 8/2007 | Rao |
| 7,336,928 B2 | 2/2008 | Paalasmaa et al. |
| 7,373,320 B1 | 5/2008 | McDonough |
| 7,373,323 B1 | 5/2008 | Dalal et al. |
| 7,405,752 B2 | 7/2008 | Kondo et al. |
| 7,418,472 B2 | 8/2008 | Shoemaker et al. |
| 7,434,050 B2 | 10/2008 | Jeffries et al. |
| 7,444,380 B1 | 10/2008 | Diamond |
| 7,487,435 B2 | 2/2009 | Aviv |
| 7,496,943 B1 | 2/2009 | Goldberg et al. |
| 7,542,920 B1 | 6/2009 | Lin-Hendel |
| 7,657,022 B2 | 2/2010 | Anderson |
| 7,660,864 B2 | 2/2010 | Markki et al. |
| 7,664,734 B2 | 2/2010 | Lawrence et al. |
| 7,688,820 B2 | 3/2010 | Forte et al. |
| 7,706,740 B2 | 4/2010 | Collins et al. |
| 7,715,790 B1 | 5/2010 | Kennedy |
| 7,725,424 B1 | 5/2010 | Ponte et al. |
| 7,783,529 B2 | 8/2010 | Sandholm et al. |
| 7,797,186 B2 | 9/2010 | Dybus |
| 7,827,235 B2 | 11/2010 | Iizuka |
| 7,853,272 B2 | 12/2010 | Tipnis et al. |
| 7,899,700 B2 | 3/2011 | Floyd et al. |
| 7,941,092 B2 | 5/2011 | Rao |
| 7,956,272 B2 | 6/2011 | Wysocki |
| 7,970,818 B2 | 6/2011 | Guedalia et al. |
| 7,974,714 B2 | 7/2011 | Hoffberg |
| 7,983,611 B2 | 7/2011 | Rao |
| 8,037,506 B2 | 10/2011 | Cooper et al. |
| 8,041,713 B2 | 10/2011 | Lawrence |
| 8,055,546 B1 | 11/2011 | Cassone et al. |
| 8,073,013 B2 | 12/2011 | Coleman et al. |
| 8,078,096 B2 | 12/2011 | Rao |
| 8,131,270 B2 | 3/2012 | Rao |
| 8,135,331 B2 | 3/2012 | Rao |
| 8,180,276 B2 | 5/2012 | Rao |
| 8,191,104 B2 | 5/2012 | Gordon et al. |
| 8,195,749 B2 | 6/2012 | Rao |
| 8,249,920 B2 | 8/2012 | Smith |
| 8,270,893 B2 | 9/2012 | Rao |
| 8,285,196 B2 | 10/2012 | Rao |
| 8,290,810 B2 | 10/2012 | Ramer et al. |
| 8,380,175 B2 | 2/2013 | Rao |
| 8,385,813 B2 | 2/2013 | Rao |
| 8,428,645 B2 | 4/2013 | Rao |
| 8,433,299 B2 | 4/2013 | Rao |
| 8,478,250 B2 | 7/2013 | Rao |
| 8,532,636 B2 | 9/2013 | Rao |
| 8,532,713 B2 | 9/2013 | Rao |
| 8,565,719 B2 | 10/2013 | Rao |
| 8,700,014 B2 | 4/2014 | Rao |
| 8,700,015 B2 | 4/2014 | Rao |
| 8,898,708 B2 | 11/2014 | Rao |
| 9,092,794 B2 | 7/2015 | Rao |
| 9,100,800 B2 | 8/2015 | Rao |
| 9,158,437 B2 | 10/2015 | Rao |
| 2001/0005837 A1 | 6/2001 | Kojo |
| 2001/0023436 A1 | 9/2001 | Srinivasan et al. |
| 2001/0034607 A1 | 10/2001 | Perschbacher et al. |
| 2001/0042041 A1 | 11/2001 | Moshal et al. |
| 2001/0044327 A1 | 11/2001 | Kanefsky |
| 2001/0044751 A1 | 11/2001 | Pugliese et al. |
| 2001/0047373 A1 | 11/2001 | Jones et al. |
| 2001/0049286 A1 | 12/2001 | Hansmann et al. |
| 2001/0056374 A1 | 12/2001 | Joao |
| 2001/0056396 A1 | 12/2001 | Goino |
| 2002/0001395 A1 | 1/2002 | Davis et al. |
| 2002/0006124 A1 | 1/2002 | Jimenez et al. |
| 2002/0007303 A1 | 1/2002 | Brookler et al. |
| 2002/0016818 A1 | 2/2002 | Kirani et al. |
| 2002/0035488 A1 | 3/2002 | Aquila et al. |
| 2002/0040346 A1 | 4/2002 | Kwan |
| 2002/0046200 A1 | 4/2002 | Floven et al. |
| 2002/0054089 A1 | 5/2002 | Nicholas et al. |
| 2002/0059132 A1 | 5/2002 | Quay et al. |
| 2002/0059373 A1 | 5/2002 | Boys |
| 2002/0059621 A1 | 5/2002 | Thomas et al. |
| 2002/0069161 A1 | 6/2002 | Eckert et al. |
| 2002/0070961 A1 | 6/2002 | Xu et al. |
| 2002/0071528 A1 | 6/2002 | Kumamoto |
| 2002/0106617 A1 | 8/2002 | Hersh |
| 2002/0107737 A1 | 8/2002 | Kaneko et al. |
| 2002/0108109 A1 | 8/2002 | Harris et al. |
| 2002/0116258 A1 | 8/2002 | Stamatelatos et al. |
| 2002/0120593 A1 | 8/2002 | Iemoto et al. |
| 2002/0123359 A1 | 9/2002 | Wei et al. |
| 2002/0128908 A1 | 9/2002 | Levin et al. |
| 2002/0138334 A1 | 9/2002 | DeCotiis et al. |
| 2002/0138392 A1 | 9/2002 | LeBlanc |
| 2002/0138462 A1 | 9/2002 | Ricketts |
| 2002/0143975 A1 | 10/2002 | Kimura et al. |
| 2002/0155419 A1 | 10/2002 | Banerjee et al. |
| 2002/0161708 A1 | 10/2002 | Offer |
| 2002/0161833 A1 | 10/2002 | Niven et al. |
| 2002/0165666 A1 | 11/2002 | Fuchs et al. |
| 2002/0178223 A1 | 11/2002 | Bushkin |
| 2002/0183059 A1 | 12/2002 | Noreen et al. |
| 2002/0188746 A1 | 12/2002 | Drosset et al. |
| 2002/0198769 A1 | 12/2002 | Ratcliff, III |
| 2003/0003946 A1 | 1/2003 | Bocconi |
| 2003/0009371 A1 | 1/2003 | Gauba et al. |
| 2003/0014400 A1 | 1/2003 | Siegel |
| 2003/0028871 A1 | 2/2003 | Wang et al. |
| 2003/0036935 A1 | 2/2003 | Nel |
| 2003/0037033 A1 | 2/2003 | Nyman et al. |
| 2003/0037068 A1 | 2/2003 | Thomas et al. |
| 2003/0046140 A1 | 3/2003 | Callahan et al. |
| 2003/0050959 A1 | 3/2003 | Faybishenko et al. |
| 2003/0060284 A1 | 3/2003 | Hamalainen et al. |
| 2003/0065784 A1 | 4/2003 | Herrod |
| 2003/0077559 A1 | 4/2003 | Braunberger et al. |
| 2003/0083895 A1 | 5/2003 | Wright et al. |
| 2003/0084051 A1 | 5/2003 | Depura et al. |
| 2003/0088452 A1 | 5/2003 | Kelly |
| 2003/0088609 A1 | 5/2003 | Guedalia et al. |
| 2003/0096625 A1 | 5/2003 | Lee et al. |
| 2003/0097280 A1 | 5/2003 | Fitzpatrick et al. |
| 2003/0115463 A1 | 6/2003 | Wheeler et al. |
| 2003/0115602 A1 | 6/2003 | Knee et al. |
| 2003/0131055 A1 | 7/2003 | Yashchin et al. |
| 2003/0144873 A1 | 7/2003 | Keshel |
| 2003/0144899 A1 | 7/2003 | Kokubo |
| 2003/0154126 A1 | 8/2003 | Gehlot |
| 2003/0154242 A1 | 8/2003 | Hayes et al. |
| 2003/0163527 A1 | 8/2003 | Hsu |
| 2003/0182245 A1 | 9/2003 | Seo |

(56) References Cited

U.S. PATENT DOCUMENTS

| | | |
|---|---|---|
| 2003/0204406 A1 | 10/2003 | Reardon et al. |
| 2003/0208433 A1 | 11/2003 | Haddad et al. |
| 2003/0208756 A1 | 11/2003 | Macrae et al. |
| 2003/0211856 A1 | 11/2003 | Zilliacus |
| 2003/0212804 A1 | 11/2003 | Hashemi |
| 2003/0216982 A1 | 11/2003 | Close et al. |
| 2003/0218604 A1 | 11/2003 | Wood et al. |
| 2003/0229533 A1 | 12/2003 | Mack et al. |
| 2003/0233422 A1 | 12/2003 | Csaszar et al. |
| 2004/0019497 A1 | 1/2004 | Volk et al. |
| 2004/0030631 A1 | 2/2004 | Brown et al. |
| 2004/0034561 A1 | 2/2004 | Smith |
| 2004/0034684 A1 | 2/2004 | Payne |
| 2004/0039684 A1 | 2/2004 | Sandor |
| 2004/0043372 A1 | 3/2004 | Jebb et al. |
| 2004/0054577 A1 | 3/2004 | Inoue et al. |
| 2004/0058694 A1 | 3/2004 | Mendiola et al. |
| 2004/0064351 A1 | 4/2004 | Mikurak |
| 2004/0064833 A1 | 4/2004 | Lee et al. |
| 2004/0072136 A1 | 4/2004 | Roschelle et al. |
| 2004/0073476 A1 | 4/2004 | Donahue et al. |
| 2004/0082346 A1 | 4/2004 | Skytt et al. |
| 2004/0122856 A1 | 6/2004 | Clearwater |
| 2004/0128183 A1 | 7/2004 | Challey et al. |
| 2004/0139232 A1 | 7/2004 | Giannetti et al. |
| 2004/0139472 A1 | 7/2004 | Furet et al. |
| 2004/0142720 A1 | 7/2004 | Smethers |
| 2004/0148219 A1 | 7/2004 | Norris, III |
| 2004/0179039 A1 | 9/2004 | Blattner et al. |
| 2004/0190767 A1 | 9/2004 | Tedesco et al. |
| 2004/0193683 A1 | 9/2004 | Blumofe |
| 2004/0210923 A1 | 10/2004 | Hudgeons et al. |
| 2004/0225606 A1 | 11/2004 | Nguyen |
| 2004/0230656 A1 | 11/2004 | Sugawara |
| 2004/0234936 A1 | 11/2004 | Ullman et al. |
| 2004/0244037 A1 | 12/2004 | Yamaguchi et al. |
| 2004/0250272 A1 | 12/2004 | Durden et al. |
| 2004/0252814 A1 | 12/2004 | Eakin |
| 2004/0260761 A1 | 12/2004 | Leaute et al. |
| 2005/0005174 A1 | 1/2005 | Connors |
| 2005/0009465 A1 | 1/2005 | Ross et al. |
| 2005/0010651 A1 | 1/2005 | Xu et al. |
| 2005/0018766 A1 | 1/2005 | Iwamura |
| 2005/0021754 A1 | 1/2005 | Alda et al. |
| 2005/0027616 A1 | 2/2005 | Jones |
| 2005/0027654 A1 | 2/2005 | Adrian |
| 2005/0028005 A1 | 2/2005 | Carson et al. |
| 2005/0044223 A1 | 2/2005 | Meyerson |
| 2005/0048954 A1 | 3/2005 | Gortz et al. |
| 2005/0054286 A1 | 3/2005 | Kanjilal et al. |
| 2005/0055310 A1 | 3/2005 | Drewett et al. |
| 2005/0060759 A1 | 3/2005 | Rowe et al. |
| 2005/0066361 A1 | 3/2005 | Iijima |
| 2005/0080683 A1 | 4/2005 | Jordan |
| 2005/0086355 A1 | 4/2005 | Deshpande |
| 2005/0086605 A1 | 4/2005 | Ferrer et al. |
| 2005/0108750 A1* | 5/2005 | Nishikawa et al. ............. 725/38 |
| 2005/0114400 A1 | 5/2005 | Rao |
| 2005/0132192 A1 | 6/2005 | Jeffries et al. |
| 2005/0144061 A1 | 6/2005 | Rarity et al. |
| 2005/0144538 A1 | 6/2005 | Lawrence et al. |
| 2005/0149501 A1 | 7/2005 | Barrett |
| 2005/0150943 A1 | 7/2005 | Rao |
| 2005/0159142 A1 | 7/2005 | Giniger et al. |
| 2005/0165663 A1 | 7/2005 | Razumov |
| 2005/0181722 A1 | 8/2005 | Kopra et al. |
| 2005/0193333 A1 | 9/2005 | Ebert |
| 2005/0203940 A1 | 9/2005 | Farrar et al. |
| 2005/0209050 A1* | 9/2005 | Bartels ............... 482/8 |
| 2005/0223068 A1 | 10/2005 | Shohfi et al. |
| 2005/0235318 A1 | 10/2005 | Grauch et al. |
| 2005/0240472 A1 | 10/2005 | Postrel |
| 2005/0240623 A1 | 10/2005 | Kobza et al. |
| 2005/0242189 A1 | 11/2005 | Rohs |
| 2005/0251749 A1 | 11/2005 | Lamkin et al. |
| 2005/0256866 A1 | 11/2005 | Lu et al. |
| 2005/0262540 A1 | 11/2005 | Swix et al. |
| 2005/0267816 A1 | 12/2005 | Jaramillo |
| 2005/0283405 A1 | 12/2005 | Mallo et al. |
| 2005/0283428 A1 | 12/2005 | Bartels et al. |
| 2005/0283736 A1 | 12/2005 | Elie |
| 2005/0288958 A1 | 12/2005 | Eraker et al. |
| 2005/0288999 A1 | 12/2005 | Lerner et al. |
| 2006/0015637 A1 | 1/2006 | Chung |
| 2006/0029051 A1 | 2/2006 | Harris |
| 2006/0031591 A1 | 2/2006 | Hollstrom et al. |
| 2006/0034266 A1 | 2/2006 | Harris |
| 2006/0036448 A1 | 2/2006 | Haynie et al. |
| 2006/0047729 A1 | 3/2006 | Yuan |
| 2006/0059174 A1 | 3/2006 | Mese et al. |
| 2006/0068818 A1 | 3/2006 | Leitersdorf et al. |
| 2006/0080232 A1 | 4/2006 | Epps |
| 2006/0085816 A1 | 4/2006 | Funk et al. |
| 2006/0085823 A1 | 4/2006 | Bell et al. |
| 2006/0091203 A1 | 5/2006 | Bakker et al. |
| 2006/0123082 A1 | 6/2006 | Digate et al. |
| 2006/0126544 A1 | 6/2006 | Markel et al. |
| 2006/0129455 A1 | 6/2006 | Shah |
| 2006/0148420 A1 | 7/2006 | Wonak et al. |
| 2006/0155513 A1 | 7/2006 | Mizrahi et al. |
| 2006/0170956 A1 | 8/2006 | Jung et al. |
| 2006/0178947 A1 | 8/2006 | Zsigmond et al. |
| 2006/0190403 A1 | 8/2006 | Lin et al. |
| 2006/0194185 A1 | 8/2006 | Goldberg et al. |
| 2006/0195441 A1 | 8/2006 | Julia et al. |
| 2006/0200384 A1 | 9/2006 | Arutunian et al. |
| 2006/0203758 A1 | 9/2006 | Tee et al. |
| 2006/0206493 A1 | 9/2006 | Lipscomb et al. |
| 2006/0227364 A1 | 10/2006 | Frank |
| 2006/0240851 A1 | 10/2006 | Washburn |
| 2006/0242687 A1 | 10/2006 | Thione et al. |
| 2006/0246915 A1 | 11/2006 | Shrivastava |
| 2006/0259866 A1 | 11/2006 | Prasad et al. |
| 2006/0261151 A1 | 11/2006 | Hansen et al. |
| 2006/0262922 A1 | 11/2006 | Margulies et al. |
| 2006/0265280 A1 | 11/2006 | Nakada et al. |
| 2006/0265281 A1 | 11/2006 | Sprovieri et al. |
| 2006/0277129 A1 | 12/2006 | Johnston |
| 2006/0282304 A1 | 12/2006 | Bedard et al. |
| 2006/0288363 A1 | 12/2006 | Kunkel et al. |
| 2006/0290661 A1 | 12/2006 | Innanen et al. |
| 2006/0294186 A1 | 12/2006 | Nguyen et al. |
| 2007/0001806 A1 | 1/2007 | Poll |
| 2007/0016472 A1 | 1/2007 | Reznik |
| 2007/0022214 A1 | 1/2007 | Harcourt |
| 2007/0025538 A1 | 2/2007 | Jarske et al. |
| 2007/0036282 A1 | 2/2007 | Engelke et al. |
| 2007/0038941 A1 | 2/2007 | Wysocki |
| 2007/0050256 A1 | 3/2007 | Walker et al. |
| 2007/0053513 A1 | 3/2007 | Hoffberg |
| 2007/0061260 A1 | 3/2007 | deGroeve |
| 2007/0086773 A1 | 4/2007 | Ramsten |
| 2007/0099636 A1 | 5/2007 | Roth |
| 2007/0101358 A1 | 5/2007 | Ambady |
| 2007/0105496 A1 | 5/2007 | Bonta et al. |
| 2007/0113263 A1 | 5/2007 | Chatani |
| 2007/0115346 A1 | 5/2007 | Kim et al. |
| 2007/0121580 A1 | 5/2007 | Forte et al. |
| 2007/0121846 A1 | 5/2007 | Altberg et al. |
| 2007/0130463 A1 | 6/2007 | Law et al. |
| 2007/0130585 A1 | 6/2007 | Perret et al. |
| 2007/0136374 A1 | 6/2007 | Guedalia |
| 2007/0136773 A1 | 6/2007 | O'Neil et al. |
| 2007/0150452 A1 | 6/2007 | Tsurumaki et al. |
| 2007/0150608 A1 | 6/2007 | Randall et al. |
| 2007/0154168 A1 | 7/2007 | Cordray et al. |
| 2007/0155411 A1 | 7/2007 | Morrison |
| 2007/0156828 A1 | 7/2007 | Bramoulle |
| 2007/0157223 A1 | 7/2007 | Cordray et al. |
| 2007/0162459 A1* | 7/2007 | Desai et al. ............... 707/10 |
| 2007/0162502 A1 | 7/2007 | Thomas et al. |
| 2007/0162566 A1 | 7/2007 | Desai et al. |
| 2007/0174861 A1 | 7/2007 | Song et al. |
| 2007/0201681 A1 | 8/2007 | Chen et al. |

(56) References Cited

U.S. PATENT DOCUMENTS

| | | |
|---|---|---|
| 2007/0204003 A1 | 8/2007 | Abramson |
| 2007/0220575 A1 | 9/2007 | Cooper et al. |
| 2007/0233729 A1 | 10/2007 | Inoue et al. |
| 2007/0235527 A1 | 10/2007 | Appleyard et al. |
| 2007/0244758 A1 | 10/2007 | Xie |
| 2007/0245365 A1 | 10/2007 | Mitsui |
| 2007/0245366 A1 | 10/2007 | Mitsui |
| 2007/0281692 A1 | 12/2007 | Bucher et al. |
| 2007/0288315 A1 | 12/2007 | Skillen et al. |
| 2007/0294354 A1 | 12/2007 | Sylvain |
| 2007/0299681 A1 | 12/2007 | Plastina et al. |
| 2008/0005341 A1 | 1/2008 | Subbian |
| 2008/0009268 A1 | 1/2008 | Ramer |
| 2008/0010351 A1 | 1/2008 | Wardhaugh et al. |
| 2008/0013700 A1 | 1/2008 | Butina |
| 2008/0021721 A1 | 1/2008 | Jones et al. |
| 2008/0022325 A1 | 1/2008 | Ober et al. |
| 2008/0027874 A1 | 1/2008 | Monseignat et al. |
| 2008/0040303 A1 | 2/2008 | Fogelson |
| 2008/0066080 A1 | 3/2008 | Campbell |
| 2008/0069120 A1 | 3/2008 | Thomas |
| 2008/0072139 A1 | 3/2008 | Salinas et al. |
| 2008/0082394 A1 | 4/2008 | Floyd et al. |
| 2008/0085675 A1 | 4/2008 | Rao |
| 2008/0085682 A1 | 4/2008 | Rao |
| 2008/0092181 A1 | 4/2008 | Britt |
| 2008/0098071 A1 | 4/2008 | Jones et al. |
| 2008/0107244 A1 | 5/2008 | Setzer |
| 2008/0109278 A1 | 5/2008 | Rao |
| 2008/0119133 A1 | 5/2008 | Rao |
| 2008/0119167 A1 | 5/2008 | Rao |
| 2008/0126113 A1 | 5/2008 | Manning et al. |
| 2008/0126193 A1 | 5/2008 | Robinson |
| 2008/0126226 A1 | 5/2008 | Popkiewicz et al. |
| 2008/0132252 A1 | 6/2008 | Altman et al. |
| 2008/0139239 A1 | 6/2008 | O'Connor |
| 2008/0159178 A1 | 7/2008 | Syrjanen et al. |
| 2008/0163075 A1 | 7/2008 | Beck |
| 2008/0167946 A1 | 7/2008 | Bezos |
| 2008/0201731 A1 | 8/2008 | Howcroft |
| 2008/0209491 A1 | 8/2008 | Hasek |
| 2008/0221986 A1 | 9/2008 | Soicher et al. |
| 2008/0222046 A1 | 9/2008 | McIsaac |
| 2008/0261524 A1 | 10/2008 | Grushkevich |
| 2008/0261625 A1 | 10/2008 | Hughes |
| 2008/0267155 A1 | 10/2008 | Aragones et al. |
| 2008/0269636 A1 | 10/2008 | Burrows et al. |
| 2008/0281687 A1 | 11/2008 | Hurwitz et al. |
| 2008/0281711 A1 | 11/2008 | Bridges et al. |
| 2008/0294760 A1 | 11/2008 | Sampson et al. |
| 2008/0299953 A1 | 12/2008 | Rao |
| 2008/0301231 A1 | 12/2008 | Mehta et al. |
| 2009/0011748 A1 | 1/2009 | Hotta |
| 2009/0037265 A1 | 2/2009 | Moona |
| 2009/0063379 A1 | 3/2009 | Kelly |
| 2009/0076882 A1 | 3/2009 | Mei et al. |
| 2009/0117845 A1 | 5/2009 | Rao |
| 2009/0119700 A1 | 5/2009 | Sansom |
| 2009/0125510 A1 | 5/2009 | Graham et al. |
| 2009/0176522 A1 | 7/2009 | Kowalewski et al. |
| 2009/0187814 A1 | 7/2009 | Raff |
| 2009/0210347 A1 | 8/2009 | Sarcanin |
| 2009/0240569 A1 | 9/2009 | Ramer et al. |
| 2009/0259552 A1 | 10/2009 | Chenard et al. |
| 2009/0320077 A1 | 12/2009 | Gazdzinski |
| 2010/0036970 A1 | 2/2010 | Sidi et al. |
| 2010/0094878 A1 | 4/2010 | Soroca et al. |
| 2010/0125498 A1 | 5/2010 | Jaramillo |
| 2010/0128666 A1 | 5/2010 | Masson et al. |
| 2010/0262923 A1 | 10/2010 | Citrin et al. |
| 2011/0041077 A1 | 2/2011 | Reiner |
| 2011/0113090 A1 | 5/2011 | Peeri |
| 2011/0125838 A1 | 5/2011 | Rao |
| 2011/0154397 A1 | 6/2011 | Macrae et al. |
| 2011/0178877 A1 | 7/2011 | Swix et al. |
| 2011/0197236 A1 | 8/2011 | Rao |
| 2011/0265116 A1 | 10/2011 | Stern et al. |
| 2012/0022905 A1 | 1/2012 | Meyer et al. |
| 2012/0060184 A1 | 3/2012 | Nguyen et al. |
| 2012/0079525 A1 | 3/2012 | Ellis et al. |
| 2012/0164937 A1 | 6/2012 | Rao |
| 2012/0233644 A1 | 9/2012 | Rao |
| 2012/0240146 A1 | 9/2012 | Rao |
| 2012/0265613 A1 | 10/2012 | Ramer et al. |
| 2012/0278823 A1 | 11/2012 | Rogers et al. |
| 2012/0284324 A1 | 11/2012 | Jarville et al. |
| 2012/0297311 A1 | 11/2012 | Duggal |
| 2013/0238445 A1 | 9/2013 | Rao |
| 2014/0038159 A1 | 2/2014 | Rao |
| 2015/0381759 A1 | 12/2015 | Rao |

OTHER PUBLICATIONS

U.S. Appl. No. 14/985,334, filed Dec. 30, 2015, Rao.
U.S. Appl. No. 14/985,336, filed Dec. 30, 2015, Rao.
U.S. Appl. No. 14/985,340, filed Dec. 30, 2015, Rao.
U.S. Appl. No. 14/985,342, filed Dec. 30, 2015, Rao.
U.S. Appl. No. 14/985,344, filed Dec. 30, 2015, Rao.
U.S. Appl. No. 14/985,351, filed Dec. 30, 2015, Rao.
U.S. Appl. No. 14/985,352, filed Dec. 30, 2015, Rao.
U.S. Appl. No. 14/985,353, filed Dec. 30, 2015, Rao.
U.S. Appl. No. 14/985,355, filed Dec. 30, 2015, Rao.
U.S. Appl. No. 10/985,702, filed Oct. 4, 2007, Office Action.
U.S. Appl. No. 10/985,702, filed Apr. 28, 2008, Office Action.
U.S. Appl. No. 10/985,702, filed Sep. 11, 2008, Office Action.
U.S. Appl. No. 10/985,702, filed Apr. 28, 2009, Office Action.
U.S. Appl. No. 10/985,702, filed Dec. 8, 2009, Office Action.
U.S. Appl. No. 10/985,702, filed Aug. 6, 2010, Office Action.
U.S. Appl. No. 11/010,985, filed Nov. 22, 2006, Office Action.
U.S. Appl. No. 11/010,985, filed May 18, 2007, Notice of Allowance.
U.S. Appl. No. 11/807,670, filed Dec. 22, 2009, Office Action.
U.S. Appl. No. 11/807,670, filed Sep. 7, 2010, Office Action.
U.S. Appl. No. 11/807,670, filed May 27, 2011, Office Action.
U.S. Appl. No. 11/807,670, filed Jan. 11, 2012, Office Action.
U.S. Appl. No. 11/807,670, filed May 17, 2012, Notice of Allowance.
U.S. Appl. No. 11/807,672, filed Jul. 9, 2009, Office Action.
U.S. Appl. No. 11/807,672, filed Jul. 29, 2010, Office Action.
U.S. Appl. No. 11/807,672, filed Apr. 27, 2011, Office Action.
U.S. Appl. No. 11/807,672, filed Mar. 20, 2012, Notice of Allowance.
U.S. Appl. No. 11/810,597, filed Jan. 28, 2010, Office Action.
U.S. Appl. No. 11/810,597, filed Oct. 13, 2010, Office Action.
U.S. Appl. No. 11/810,597, filed May 16, 2011, Office Action.
U.S. Appl. No. 11/810,597, filed Oct. 21, 2011, Office Action.
U.S. Appl. No. 11/810,597, filed Apr. 5, 2012, Office Action.
U.S. Appl. No. 11/810,597, filed Sep. 25, 2012, Office Action.
U.S. Appl. No. 11/821,771, filed Nov. 26, 2010, Office Action.
U.S. Appl. No. 11/821,771, filed Jun. 29, 2011, Office Action.
U.S. Appl. No. 11/821,771, filed Dec. 14, 2011, Notice of Allowance.
U.S. Appl. No. 11/823,006, filed Nov. 28, 2011, Office Action.
U.S. Appl. No. 11/823,006, filed Apr. 11, 2012, Office Action.
U.S. Appl. No. 11/823,006, filed Jun. 3, 2013, Office Action.
U.S. Appl. No. 11/823,006, filed Mar. 10, 2014, Office Action.
U.S. Appl. No. 11/881,195, filed Sep. 28, 2010, Office Action.
U.S. Appl. No. 11/881,195, filed Jun. 9, 2011, Office Action.
U.S. Appl. No. 11/881,195, filed May 21, 2012, Office Action.
U.S. Appl. No. 11/881,195, filed Oct. 18, 2012, Office Action.
U.S. Appl. No. 11/881,195, filed Jul. 18, 2013, Office Action.
U.S. Appl. No. 11/881,195, filed Dec. 11, 2013, Notice of Allowance.
U.S. Appl. No. 11/888,100, filed Aug. 4, 2010, Office Action.
U.S. Appl. No. 11/888,100, filed May 27, 2011, Office Action.
U.S. Appl. No. 11/888,100, filed Dec. 19, 2011, Notice of Allowance.
U.S. Appl. No. 11/891,193, filed Sep. 2, 2010, Office Action.
U.S. Appl. No. 11/891,193, filed May 16, 2011, Office Action.
U.S. Appl. No. 11/891,193, filed Jan. 27, 2012, Office Action.
U.S. Appl. No. 11/891,193, filed Apr. 13, 2012, Notice of Allowance.
U.S. Appl. No. 11/891,193, filed Jan. 4, 2013, Notice of Allowance.
U.S. Appl. No. 11/897,183, filed Oct. 5, 2010, Office Action.
U.S. Appl. No. 11/897,183, filed Mar. 15, 2011, Office Action.
U.S. Appl. No. 11/897,183, filed Dec. 16, 2011, Office Action.

(56) References Cited

OTHER PUBLICATIONS

U.S. Appl. No. 11/897,183, filed Jul. 2, 2012, Notice of Allowance.
U.S. Appl. No. 11/897,183, filed Oct. 16, 2012, Notice of Allowance.
U.S. Appl. No. 11/977,763, filed Aug. 4, 2010, Office Action.
U.S. Appl. No. 11/977,763, filed Apr. 4, 2011, Notice of Allowance.
U.S. Appl. No. 11/977,764, filed Sep. 2, 2010, Office Action.
U.S. Appl. No. 11/977,764, filed Feb. 22, 2011, Notice of Allowance.
U.S. Appl. No. 11/978,851, filed Feb. 24, 2011, Office Action.
U.S. Appl. No. 11/978,851, filed Nov. 2, 2011, Office Action.
U.S. Appl. No. 11/978,851, filed Jun. 18, 2012, Notice of Allowance.
U.S. Appl. No. 12/011,238, filed Jul. 8, 2010, Office Action.
U.S. Appl. No. 12/011,238, filed Feb. 9, 2011, Office Action.
U.S. Appl. No. 12/011,238, filed Sep. 14, 2011, Office Action.
U.S. Appl. No. 12/011,238, filed Aug. 14, 2012, Office Action.
U.S. Appl. No. 12/011,238, filed Feb. 27, 2013, Office Action.
U.S. Appl. No. 12/011,238, filed Sep. 19, 2013, Office Action.
U.S. Appl. No. 13/017,024, filed Nov. 21, 2012, Office Action.
U.S. Appl. No. 13/075,144, filed Aug. 25, 2011, Notice of Allowance.
U.S. Appl. No. 13/075,882, filed Mar. 25, 2013, Office Action.
U.S. Appl. No. 13/075,882, filed Oct. 8, 2013, Office Action.
U.S. Appl. No. 13/075,882, filed Oct. 17, 2014, Notice of Allowance.
U.S. Appl. No. 13/093,733, filed Sep. 14, 2011, Office Action.
U.S. Appl. No. 13/093,733, filed Jan. 26, 2012, Office Action.
U.S. Appl. No. 13/093,733, filed Mar. 19, 2012, Notice of Allowance.
U.S. Appl. No. 13/237,625, filed Oct. 15, 2012, Office Action.
U.S. Appl. No. 13/237,625, filed Nov. 30, 2012, Notice of Allowance.
U.S. Appl. No. 13/354,811, filed May 9, 2013, Notice of Allowance.
U.S. Appl. No. 13/397,136, filed Jun. 4, 2012, Office Action.
U.S. Appl. No. 13/397,136, filed Jan. 24, 2013, Notice of Allowance.
U.S. Appl. No. 13/402,880, filed Sep. 10, 2012, Office Action.
U.S. Appl. No. 13/402,880, filed Apr. 18, 2013, Office Action.
U.S. Appl. No. 13/402,880, filed Jun. 25, 2013, Notice of Allowance.
U.S. Appl. No. 13/412,574, filed Dec. 20, 2012, Office Action.
U.S. Appl. No. 13/412,574, filed Aug. 15, 2013, Office Action.
U.S. Appl. No. 13/412,574, filed Jan. 5, 2015, Office Action.
U.S. Appl. No. 13/412,574, filed Jul. 15, 2015, Office Action.
U.S. Appl. No. 13/473,603, filed Nov. 7, 2013, Office Action.
U.S. Appl. No. 13/473,606, filed May 30, 2014, Office Action.
U.S. Appl. No. 13/473,606, filed Aug. 21, 2014, Office Action.
U.S. Appl. No. 13/484,605, filed Oct. 11, 2012, Office Action.
U.S. Appl. No. 13/484,605, filed Jun. 25, 2013, Notice of Allowance.
U.S. Appl. No. 13/554,619, filed Mar. 12, 2013, Office Action.
U.S. Appl. No. 13/554,619, filed Jun. 13, 2013, Notice of Allowance.
U.S. Appl. No. 13/554,685, filed Dec. 29, 2014, Office Action.
U.S. Appl. No. 13/554,685, filed Feb. 26, 2015, Notice of Allowance.
U.S. Appl. No. 13/869,678, filed Oct. 20, 2015, Office Action.
U.S. Appl. No. 13/902,839, filed Oct. 30, 2013, Office Action.
U.S. Appl. No. 13/902,839, filed Feb. 4, 2014, Notice of Allowance.
U.S. Appl. No. 13/908,447, filed Jun. 24, 2015, Notice of Allowance.
U.S. Appl. No. 14/047,015, filed Nov. 30, 2015, Office Action.
U.S. Appl. No. 14/059,878, filed May 20, 2015, Notice of Allowance.
U.S. Appl. No. 14/059,878, filed Jun. 24, 2015, Notice of Allowance.

* cited by examiner

MOBILE DEVICE AND SYSTEM FOR MULTI-STEP ACTIVITIES

CROSS REFERENCES TO RELATED APPLICATIONS

The present application is a continuation of, makes reference to, claims priority to, and claims benefit of U.S. Non-Provisional application Ser. No. 11/881,195, entitled AUDIO GUIDED SYSTEM FOR PROVIDING GUIDANCE TO USER OF MOBILE DEVICE ON MULTI-STEP ACTIVITIES filed on Jul. 25, 2007, which in turn is a makes reference to, claims priority to, and claims benefit of U.S. Provisional Application Ser. No. 60/860,700 entitled AUDIO GUIDED SYSTEM FOR PROVIDING GUIDANCE TO USER OF MOBILE DEVICE ON MULTI-STEP ACTIVITIES filed on Nov. 22, 2006, the complete subject matter of which is hereby incorporated herein by reference, in its entirety.

This patent application makes reference to U.S. provisional patent Ser. No. 60/849,715, entitled "QUESTIONNAIRE CLIENT FOR MOBILE DEVICE", filed on Oct. 4, 2006, The complete subject matter of the above-referenced United States patent application is hereby incorporated herein by reference, in its entirety.

The present application makes reference to U.S. Provisional Application Ser. No. 60/850,084 entitled MOBILE DEVICE FOR CREATING ADHOC QUESTIONNAIRE filed on Oct. 7, 2006, the complete subject matter of which is hereby incorporated herein by reference, in its entirety.

In addition, the present application makes reference to U.S. application Ser. No. 10/985,702 entitled QUESTIONNAIRE NETWORK FOR MOBILE HANDSETS filed on Nov. 10, 2004, the complete subject matter of which is hereby incorporated herein by reference, in its entirety.

BACKGROUND

1. Technical Field

The present invention relates generally to the interactions between mobile handset and a server within a network, and more specifically to the ability to browse through a multi-step process or activity using a mobile handset such as a cell phone.

2. Related Art

Electronic devices, such as mobile phones and personal digital assistants (PDA's), often contain small screens with very limited viewing area. They are constrained in terms of how much information can be displayed, and in terms of user interaction capabilities. The keyboards on cell phones, for example, are not conducive for user data entry, and only brief user inputs can be solicited from a user without annoying the user.

Often a user would want to seek online help using a mobile phone for conducting an activity such as fixing a problem with a car (changing tires for example) or baking a cake, without having to use a bulky notebook computer that might get damaged due to various constraints and problems of a work area. The use of a computer/notebook is not always possible to retrieve helpful information when they are needed, such as during an accident on the highway, or while cooking in a kitchen that has limited space. The use of a mobile phone is preferable in such circumstances but mobile phones in general are not endowed with the features or applications necessary to facilitate easy access to such information in a format that is useable and convenient. The whole process of retrieving necessary information using a mobile phone is inconvenient due to the inability of the Internet websites to provide information that a typical user can easily read, browse through or view on his mobile phone. Information access from Internet based websites from mobile devices are quite often unsatisfactory and not useful due to several factors, not least of which is the multi-media and graphics rich format in which most Internet websites are designed and made available. A mobile phone with a small screen is not a good candidate for viewing such complicated and graphics rich (with graphics, flash screens, video components, etc.) content.

Often, when a user is driving, he would like to access information from a remote source, such as a website maintained by the operator of the network. However, while driving it is very dangerous to read the information displayed on a cell phone. It is also almost impossible to read those small screens on a cell phone and manipulate the buttons on the cell phone while also driving. It is hard enough manipulating a cell phone keyboard when one is not driving, due to the nature of the keyboard and the tiny keys it provides and the small displays it comes with.

Online help, which typically tends to be verbose, is almost unreadable and altogether complex and inappropriate for access from a cell phone. For example, online help for configuring a network card on a PC, or baking a turkey for Thanksgiving, tend to involve a multi-step activity and therefore detailed in its descriptions. Not only are online help websites not suitable for access via cell phones—they make for bad user experience, but also too verbose and repetitive. Thus, users of cell phones refrain from seeking online help from cell phones.

User interaction in real time, such as those provided for a user using a PC on the Internet, are often not possible for a user using a cell phone. For example, the amount of textual information cannot be a full page of textual information that is typically made available o a PC. Graphical information also cannot be large. A typical website provides a rich multi-media experience. The same website, when accessed from a cell phone, would not only be unreadable, due to its large amount of text, graphics and even video, but also frustrating due to the nature of web sites—the design of websites often being multi-media based (predominantly providing large multi-media web pages full of text, graphics, flash-based and even containing videos). Thus, there is a problem in presenting a mobile user with information in order to solicit user input when the user is using a cell phone. Soliciting user input from a user when the user is using a cell phone, rather than a PC, is a big problem.

Cell phones are therefore a device for which traditional websites are ill prepared to provide information. In addition, surveys or questionnaires that are created for Internet based access via a PC are not appropriate for cell phone access. Asking one or more detailed questions with information on how to answer them is possible on a web page that is accessed from a PC. However, the same web page would be unmanageable and difficult to browse and navigate on a cell phone with a small LCD screen and small keyboard for user input.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

The numerous objects and advantages of the present invention may be better understood by those skilled in the art by reference to the accompanying figures in which.

DETAILED DESCRIPTION OF THE DRAWINGS

Figure 1:
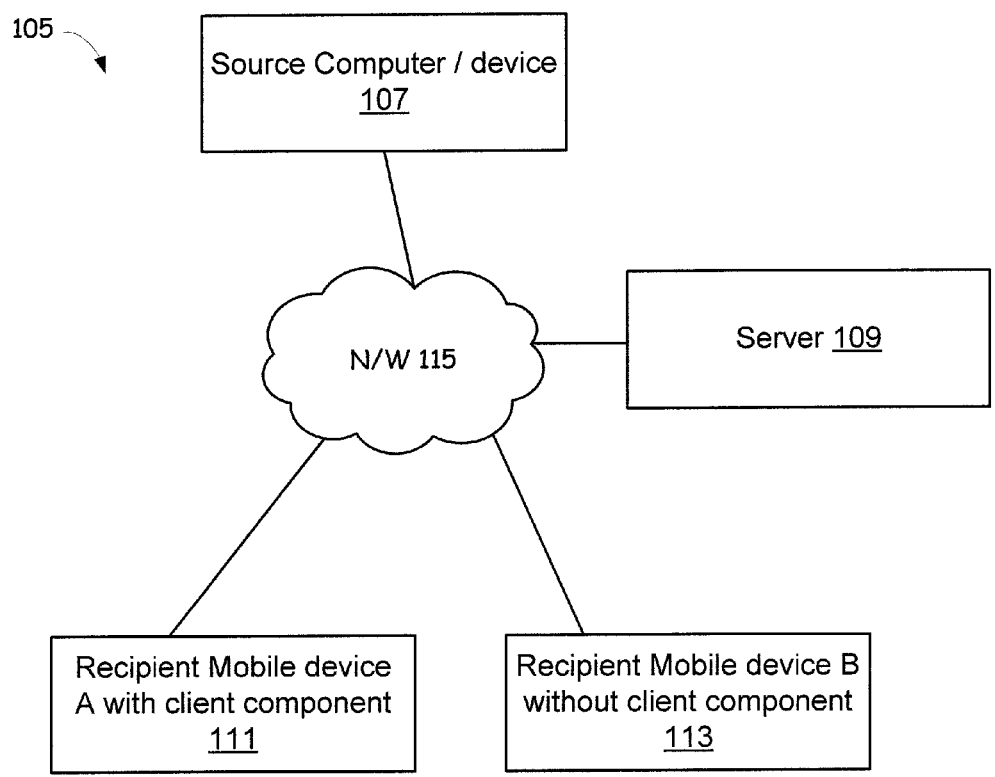
FIG. 1 is a perspective block diagram of an audio guided system for mobile devices that facilitates the creation and dissemination of audio guided activities (AGAs) from a source computer/device to a plurality of other recipient mobile devices, wherein the AGA is disseminated to the recipient mobile devices in a form that is compatible with the capabilities of the respective recipient mobile devices.

FIG. 1 is a perspective block diagram of an audio guided system 105 (AUGUST) for mobile devices that facilitates the creation and dissemination of audio guided activities (AGAs) from a source computer/device 107 to a plurality of other recipient mobile devices 111, 113, wherein the AGA is disseminated to the recipient mobile devices in a form that is compatible with the capabilities of the respective recipient mobile devices 111, 113. The audio guided system 105 comprises the source computer/device 107, the plurality of other recipient mobile devices 111, 113 and a server 109. The display of AGAs in a recipient mobile device, such as the recipient mobile device A 111, requires the use of a corresponding client component, such as a QClient, that can display one step of a multi-step activity at a time. Each AGA comprises textual descriptions, audio preambles, optional audio supplementary information, an optional textual supplementary information, for each step of a multi-step audio guided activity. An AGA is used to describe the method to cook a dish using an associated recipe, the process of executing an operation, such as changing the tire on a car, using an associated multi-step operation, etc. The display of each step involves the display of textual descriptions, the playing of audio information such as a preamble, the optional display of supplementary information and the playing of audio supplementary information, if available. A user can view (often using text, and even graphics if available) and optionally listen to the detailed descriptions of each step of an AGA, one step at a time, and browse through each step.

Some of the plurality of other recipient mobile devices 111, 113 are legacy devices that do not have a necessary client component capable of handling the download and display of AGAs. Others of the plurality of other recipient mobile devices 111, 113 have the client component capable of handling the download and display of the AGAs.

In one embodiment, the server 109 determines which recipient mobile device can handle AGAs (because they comprise the client component capable of handling the AGAs), and which need to be sent a simpler subset of the AGAs that can be displayed/rendered without the client component, such as by the use of a browser in the recipient mobile device that may be used to browse through a hosted version of the AGAs that can present web pages of the AGAs.

The audio guided activity is created/stored/distributed as a packaged content with a multiple step activity, such as an XML file, wherein each step comprises:
- an audio preamble, used to describe in audio form the purpose of the current step and provide an overview of the step (other types of information may also be provided if necessary, in a brief format)
- a textual step description regarding the activity, in succinct form, with minimal text, and
- an audio supplementary information, providing additional details that may help a user better understand the step, its benefits, alternate steps, if any, and any additional detail that may aid the user's comprehension of the step.

Typically, the audio preamble and audio supplementary information are presented to a user in order to provide audio based description and additional details of specific steps of a multi-step activity. The textual step description of each step of a multi-step activity is designed to provide minimal necessary information for a user, with supplementary information in audio or textual (or video and graphics forms too, in some embodiments) form provided to aid user comprehension of the associated step in the multi-step activity.

The textual step description typically comprises a textual description (of the specific step in the multi-step activity) in the form of a small paragraph. Optionally, it also comprises of a graphics or a picture (to be supported in specific embodiments, or in specific devices based on device capability information). In general, the mobile device employs a client that provides a window pane or dialog box (or other similar graphical widgets) for textual description display, with a menu-item "Info" for playing the preamble, and another menu-item "SupplInfo" for playing audio supplementary information while also displaying any supplementary textual information that may be available. In addition, a Next menu-item is provided to advance to a next step of the multi-step activity, if any) and a cancel menu-item that is provided to terminate the multi-step activity.

The source computer device 107 captures audio preambles and supplementary information provided by a user in audio form, captures text descriptions typed in or provided by user in some form, creates a package of such content associated with an audio guided activity, and sends it to a server 109 to be saved and/or disseminated to designated recipients. The recipients use their respective recipient mobile devices 111, 113 for browsing through the audio guided activity when they receive it. They can use the client component, if it is available, for such browsing. Alternatively, they can use a browser (such as a WAP browser) to browse through the AGA.

The server 109 receives AGAs from the source mobile computer/device 107, adds boilerplate text and audio if necessary, determines which of the recipient mobile devices specified, such as recipient mobile devices 111 and 113, can handle the all the contents of the AGA (audio components, textual components, graphics if any, video is any), and which need to be sent a simpler subset of the AGA, such as only text, or only audio components of the AGA.

The server 109 is capable of converting recipient list to a list of phone numbers or IP addresses as needed, in order to communicate the AGA, or a notification regarding the AGA, to the recipient mobile devices 111, 113. In order to play all the components of an AGA, if required, the recipient devices, such as the recipient device 111, have a client component that can handle all the components of a AGA, audio, textual, graphics and even video components).

In one embodiment the client component is required in a recipient mobile device to handle the components of an AGA, such as audio and textual. In order to play all the components of an AGA, if required, the recipient devices, such as the recipient device 113, do not have a client component. Instead, the server 109 makes it possible for them to receive and display/play the AGA by sending them the same AGA in an alternate form, such as a simplified set of web pages, that the recipient client device 113 can display using a browser or some other existing client in the recipient mobile device 113. In addition, the recipient client device 113 will be sent a notification regarding the AGA that also comprises a link that can be activated to download the client component so that it could be installed before displaying the AGA.

The recipient mobile device 113 without client component gets an opportunity to download & install the necessary client component. The user can then activate the download link whereupon the client component is downloaded and installed automatically (or with user opt-in). The user of the recipient mobile device 113 also is given the option, selectively, to receive a subset of AGA that recipient mobile device 113 can handle without the client component.

The recipient mobile device 111 with the client component receives an AGA, lets user browse through each step and view the textual components and listen to audio components for each step them. It is able to play/render/display all portions of an AGA that may be provided, such as audio, text, graphics, video, etc.

The server 109 is capable of completing the incomplete AGA received from the source computer/device 107 or another server (not shown). For example, the source computer/device 107 may send an incomplete AGA with two steps, each with only the audio preamble created (by a user recording the steps of an activity in audio form that incorporates a brief descriptions of steps involved) and the server 109 incorporates a generic textual preamble and a generic textual description in order to complete the AGA. In one embodiment, the server transcribes the audio components into textual components and sends those transcribed text (perhaps along with the other boilerplate text) to recipients who cannot handle audio components of an AGA. Thus, for example, spoken preambles and supplementary information, in a questionnaire can be converted into equivalent textual components by the server 109, in an automated way, so that devices that cannot handle audio preambles and audio supplementary information (or video preambles and video supplementary information) can be provided with equivalent and/or relevant textual components.

The server 109 receives an AGA from a user, incorporates text or graphics as needed, and generic prompt to user, and sends questionnaire to recipients. The recipients are either specified by the user along with the questionnaire or pre-configured and stored in the server 109 to be used to forward AGA. The server 109 provides coupons to a user at the end of the AGA, or during the display of an AGA by means of a menu-item provided to retrieve a coupon and information associated with a coupon. Additionally, it is possible to configure the server 109 to provide coupons (one or more) to a recipient mobile device 111, 113 along with an AGA, such that those coupons can be saved on the recipient mobile device 111, 113 for subsequent usage using the recipient mobile devices 111, 113.

The server 109 also supports the notification of the availability of the AGA and the dissemination of an AGA to the recipient mobile devices 111. The user interaction is facilitated by a client component in the recipient mobile device 111, which is either made available by the manufacturer of the mobile handsets or subsequently downloaded over the air, or otherwise installed by the user. The client component is able to process the received AGA (or portions thereof), playing audio portions such as audio preambles, audio supplementary information, etc. and displaying textual preambles and textual descriptions of individual steps of a multi-step activity/operation.

In one embodiment, the system 105 comprises mobile devices 107, 111, 113 which are a combination of cellular phones, PDAs, etc. and the network is 115 is a wireless and/or wired network, cellular network such as 3G, UMTS, CMDA, GSM, etc., a WLAN network, or a WiMAX network, Internet, Bluetooth, IrDA, etc.

The server 109 receives Audio Guided Activity from source computer/device 107, adds boilerplate text if needed, and forwards it to specified recipients 111, 113. In one embodiment, it multicasts/broadcasts it over a multicast network 115 or a broadcast network 115.

In one embodiment, more than one version of an audio guided activity is created by the source computer device 107, and stored for dissemination at the server 109. Particular versions of the audio guided activity are communicated to specific mobile device 107, 111, 113, based on one or more criteria, such as user preferences, user interests, user group affiliations, membership information, etc. Such preferences user interests, user group affiliations, membership information are stored in the server 109 in one embodiment, and in the mobile devices 107, 111, 113 in another. In a related embodiments, they are stored in both.

In one embodiment, the source computer/device is used to create a multistep audio guided activity that provides at least one (if not more than one) of an audio preambles, short textual descriptions, and audio supplementary information for each of the steps of the multistep audio guided activity. The multistep audio guided activity is sent to server 109 to be disseminated to one or more recipient devices that are mobile phones, PDAs, computers, PCs, etc.

The AGAs facilitated by the present invention are used to create and disseminates multistep activity information such as the steps necessary to diagnose and fix a problem with a machine, an electronic device or a vehicle. AGAs, in accordance with the present invention, are used to provide detailed help/guidance, in a timely fashion to people trying to configure a device, configure a service, or work on a vehicle, etc. For example, an audio guided activity can comprise a sequence of steps necessary to configure a service, a machine, an electronic device or a vehicle.

Figure 2:
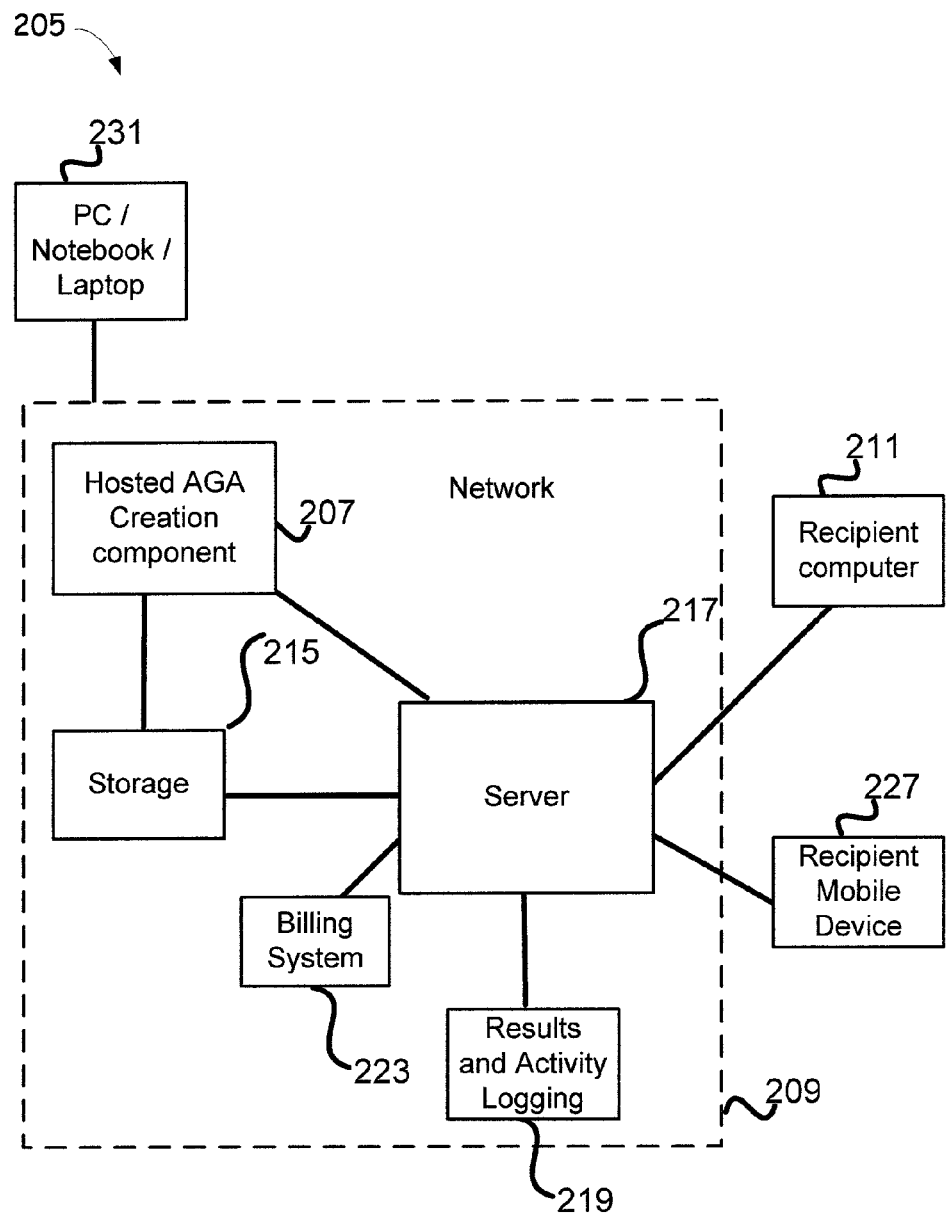
FIG. 2 is a perspective block diagram of a system that supports AGA creation and dissemination, the AGA creation facilitated by the use of a PC/computer, by a user.

FIG. 2 is a perspective block diagram of a system 205 that supports AGA creation and dissemination, the AGA creation facilitated by the use of a PC/computer 231, by a user. The system 205 comprises the PC/computer 231 that a user uses to create AGAs, a server 217 that receives the AGAs and sends them to one or more recipient mobile devices 211, 227, and a hosted AGA creation component 207 that facilitates AGA creation using the PC/laptop/computer 231, or via web pages provided by the server 217. The system 205 also comprises a storage 215 that is used to store AGAs and questionnaires if necessary, and a results and activity logging component 219 that can be used to track AGA creation, AGA dissemination, and other related activities. In addition, the system 205 comprises a billing system 223 that can facilitate billing for the creation of AGAs, the distribution of AGAs, etc.

AGA creation in facilitated by the hosted AGA creation component 207 that can be accessed and used by a user employing the PC/Notebook/Laptop 231. AN AGA creation tool installed in the PC/Notebook/Laptop 231 may also be used by a user to create AGAs that can be uploaded to the server 217. A user with AGA creation tool in the PC/Notebook/Laptop 231 creates an AGA and sends the created AGA to recipients/a mailing-list.

The user can also employ a PC/Notebook/Laptop 231 communicatively coupled to a hosted AGA creation component 217 to create AGAs with only audio inputs and textual inputs provided by the user for the various steps of an associated activity. The AGA is likely to comprise of audio and/or textual preambles for the steps of an audio guided activity, textual descriptions of the steps of the associated activity, supplementary information in audio and textual formats (even graphics and video formats) for each of the steps, etc. Then user provides a recipient list in one or more formats. The server 217 sends out the AGA to recipients specified by the user, using their corresponding mobile phone numbers, IP addresses, email addresses, etc. A recipient user can use his recipient computer 211 to receive or browse thorough the AGA. A different recipient user can use the recipient mobile device 227 to do the same.

When a recipient using the recipient mobile device 227 gets the AGA on his mobile device, the steps of the AGA themselves are provided to the recipient by the server 217, starting with the first step of a multi-step activity. Thus, in the beginning of the AGA, the recipient would view the first step perhaps with an audio preamble and appropriate textual description, and would be able activate an Info menu item to hear the audio preamble for the first step. The user advances to the next step by activating the Next menu item to proceed.

In one embodiment, the recipient device is a legacy device 227 and not capable of letting a recipient user work through the steps of the AGA. For such a device, the server 217 sends a voice mail notification to the recipient device 227 and when triggered by the recipient device 227, causes the audio preamble of the steps to be played as voice information, such as those that employ interactive voice response (IVR) systems (not shown). The user is provided with the option to advance to the next step when ready. Thus, part of the AGA, the audio preamble and audio supplementary information, is played as part of a UVR based audio playback. Such a solution wherein IVR is used makes it possible to incorporate "legacy" devices and land line devices into the system 205 and have them participate in receiving AGAs and browsing through them. The server 217 thus employs the services of an IVR component to provide AGAs to recipients on legacy devices (and other devices that do not have an appropriate client software installed) in order to facilitate access from such devices.

In one embodiment, the recipient mobile device 227 is a legacy device 227 and not capable of letting a recipient user work through the AGA as it does not have a client component. Instead, it has a browser that can be used to browse though the steps of the AGA, the steps provided employing web pages hosted by the server 217, presenting one or more steps in each web page of the AGA.

In one embodiment, an XML audio guided activity (AGA) is created/stored/by a user using a PC/notebook/laptop 231. It is created as an XML file comprising a multiple step activity—wherein each step comprises:
  an audio preamble,
  d a textual step description, and
  d an audio supplementary information.

The audio preamble and audio supplementary information are played/rendered during a display of a step of activity, when invoked by the user using appropriate menu-items or buttons. The textual step description comprises Textual description in the form of a small paragraph. Optionally, it also comprises of a graphics or a picture (that is also provided as part of the XML AGA).

In one embodiment, the PC/notebook/Laptop 231 comprises a tool called the QCreator that can operate in two modes, a questionnaire creation mode and a AGA creation mode. The output created is a Questionnaire or an Audio guided Activity (AGA) to be used by an Audio Guided System (AUGUST). If Questionnaire is the mode set during the use of the tool, a questionnaire is created, with user interface customized for such creation. If AGA is the mode set on the tool, then screens appropriate for the creation of an AGA are provided to the user.

Figure 3A:
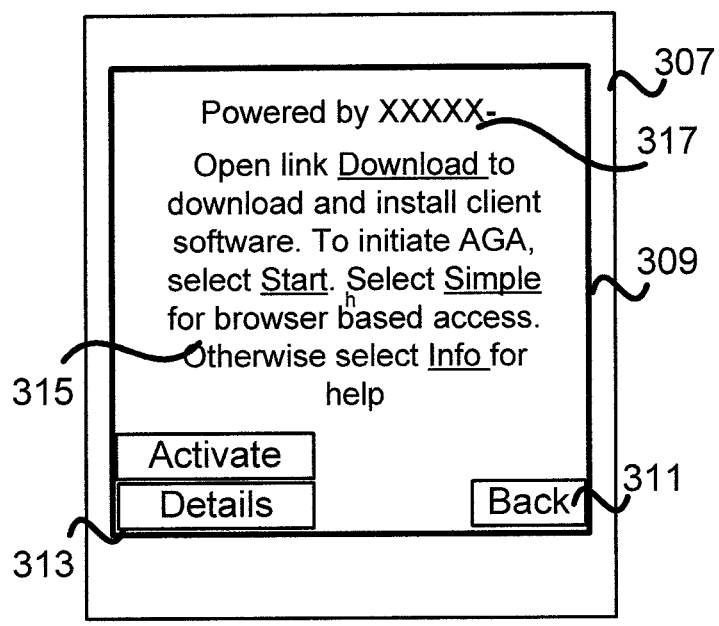
FIG. 3A is an exemplary notification message display screen for a mobile device 307 that supports the display of AGA using a client component, or the browsing through an AGA from the mobile device.

FIG. 3A is an exemplary notification message display screen 309 for a mobile device 307 that supports the display of AGA using a client component, or the browsing through an AGA from the mobile device 307. Notifications, such as those received as an SMS message, received by user (for example, of type Service message) on mobile device 307, offers the user an opportunity to download a client component that is capable of displaying an AGA. If the user of the recipient mobile device does not have an appropriate client component (such as a qClient component capable of displaying an AGA and questionnaires), then the user can still view the AGA by viewing the hosted version of the AGA using a browser in the device, such a browser retrieving one or more web pages for the AGA using a link (URL or some such reference) to the AGA provided as part of the notification message (such as a URL in an SMS message). Thus, the notification also offers link to the AGA that a browser can use to provide access to associated web pages for the AGA. Notification messages (such as SMS based ones) can be flagged to be service messages, and are sent to mobile device by service providers supporting/providing AGAs. They contain links through which the message content, such as AGAs and questionnaires, can be downloaded.

It is possible to automatically download client component for a AGA (such as qClient) and the associated AGA to the mobile device 307, if the user has configured the mobile device to download messages/content automatically.

Figure 3B:
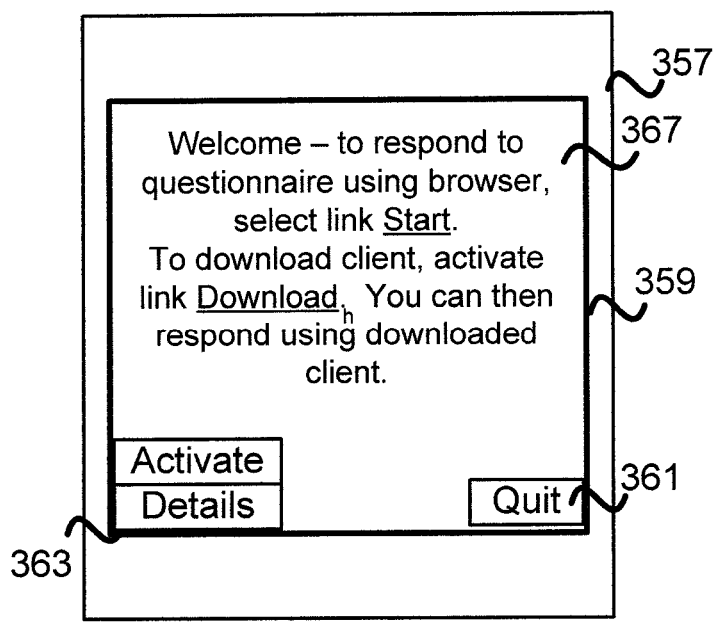
FIG. 3B is an exemplary notification message displayed in a notification window (or pane) on a mobile device, wherein the user is provided the opportunity to start reviewing an AGA using a link provided, that a browser can retrieve, and wherein the user is also provided with the links to download the client component if necessary in order to view the AGA locally in the mobile device.

FIG. 3B is an exemplary notification message 367 displayed in a notification window (or pane) 359 on a mobile device 357, wherein the user is provided the opportunity to start reviewing an AGA using a link provided, that a browser can retrieve, and wherein the user is also provided with the links to download the client component if necessary in order to view the AGA locally in the mobile device 357.

The user who receives notification (such as SMS) can open a URL link provided to review an audio guided activity, using a client such as a browser, interacting with server that is remotely hosted. Alternatively, user can download client activating Download link and then review the AGA locally using the downloaded client.

In addition to AGAs, questionnaires can also be received and reviewed using the mobile device 357. A user who receives notification (such as SMS) can also open a URL link provided to respond to a questionnaire, using client software such as a browser, interacting with server that is remotely hosted that provides web pages for the questionnaire. Alternatively, the user can download client component (such as qClient) by activating a Download link in the received notification (such as SMS message) and then respond locally using downloaded client (that is then installed too).

Figure 3C:
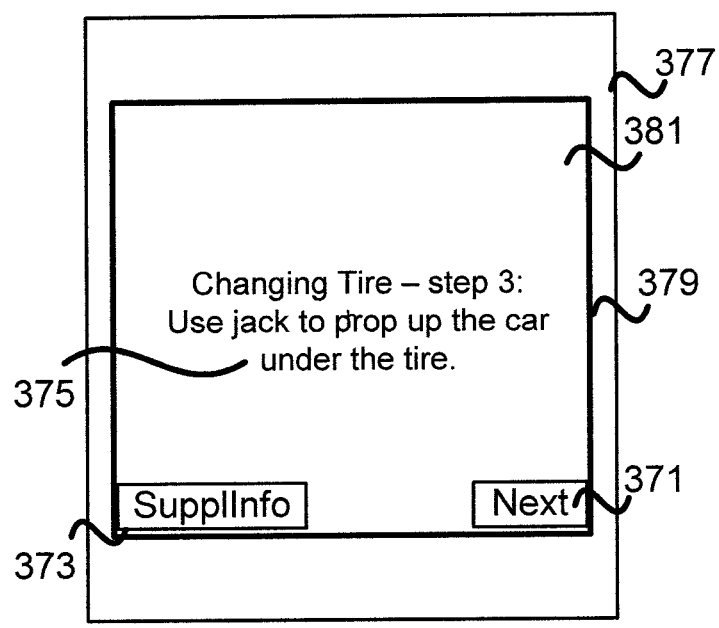
FIG. 3C is an exemplary browser window on a mobile device that is used to retrieve and display activity steps provided as a web pages regarding an audio guided activity, that is distributed by a server in an audio guided system or network.

FIG. 3C is an exemplary browser window 379 on a mobile device 377 that is used to retrieve and display activity steps provided as a web pages regarding an audio guided activity, that is distributed by a server in an audio guided system or network. For the mobile device 377 with no Qclient installed, a browser in the mobile device 377 is used by a user to interact with a server that provides web pages of the AGA. The browser in the mobile device 377 retrieves one step of the multi-step activity at a time and displays it. Audio component, if any, in each page is played by a media player (or some audio player) in mobile device 377. Similarly video content and graphics content, if any are displayed using appropriate plug-ins to the browser.

Thus, in a mobile device 377 with no Qclient, a browser in the mobile device 377 is used to interact with a server that provides the webpages for the various steps of an activity. The browser in mobile device 377 retrieves one question at a time and displays it. Audio component in each page is played by a media player (or some audio player) in the mobile device 377.

Figure 4:
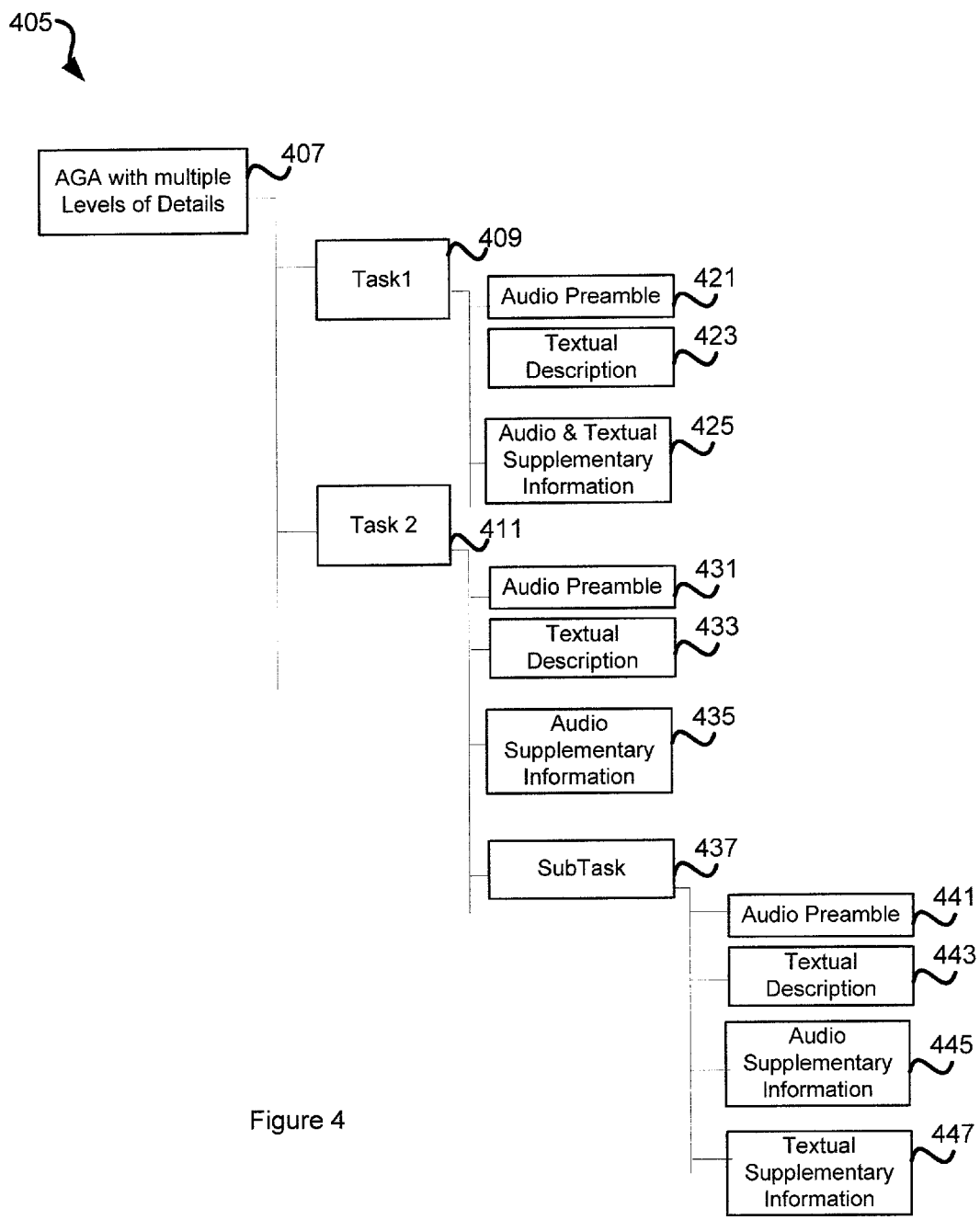
FIG. 4 is a perspective block diagram of the layout of an exemplary audio guided activity that comprises one or more tasks, each with a preamble, a textual description and supplementary information.

FIG. 4 is a perspective block diagram of the layout of an exemplary audio guided activity 407 that comprises one or more tasks 409, 411, each with a preamble, a textual description and supplementary information. The audio guided activity 407 supports multiple levels of details, in that specific tasks associated with specific steps of an activity may comprise of sub tasks. The details of these subtasks may also be specified in the AGA 407. For example, a subtask 437 of task 2 411 may be displayed if necessary by a client component of a mobile device—which would display current portions of the AGA when requested by a user. For the subtask 437, the client displaying the AGA would then display the textual description 443 associated and play the audio preamble 441. In addition, when invoked, the supplementary information 445, 447 for the subtask 437 is also played/displayed respectively.

Figure 5:
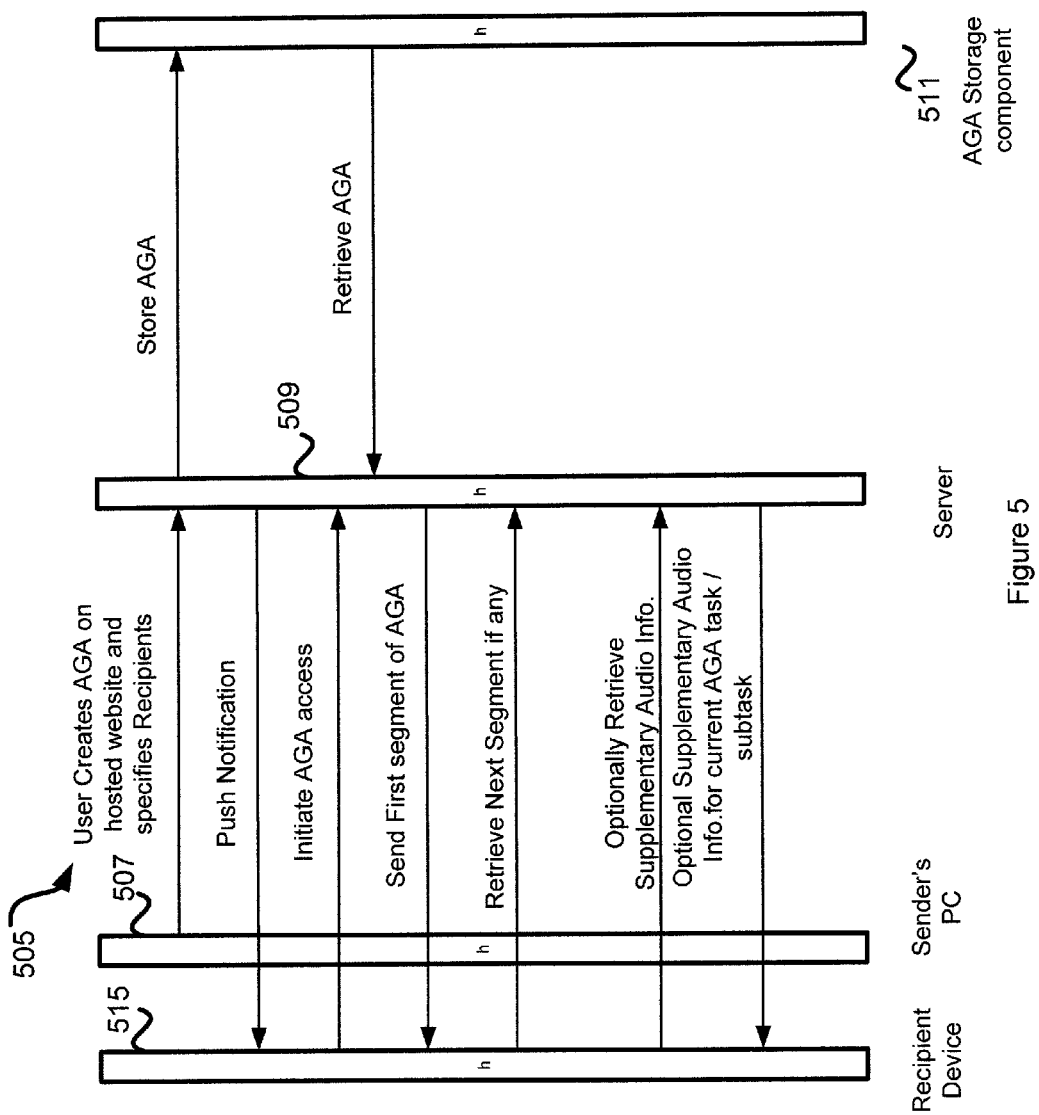
FIG. 5 is an interaction diagram that depicts an exemplary interaction between a sender's PC, notebook, PDA or laptop that is used to create and upload AGAs and questionnaires and a recipient mobile device used to respond to the AGAs and questionnaire, wherein the sender's PC, notebook, PDA or laptop is used by a user to create AGAs with textual and audio components that a server enhances, if necessary, and sends it to recipients.

FIG. 5 is an interaction diagram that depicts an exemplary interaction between a sender's PC, notebook, PDA or laptop 507 that is used to create and upload AGAs and questionnaires and a recipient mobile device 515 used to respond to the AGAs and questionnaire, wherein the sender's PC, notebook, PDA or laptop 507 is used by a user to create AGAs with textual and audio components that a server 509 enhances, if necessary, and sends it to recipients. In one embodiment, the sender's PC, notebook, PDA or laptop 507 comprise the plugin client that works with browsers to facilitate creation of AGAs and browsing through any AGAs received. The user's PC, notebook, PDA or laptop 507 initially sends helps a user create an AGA and then send it to the server 509, along with a list of recipients. The server 509 then forwards the AGA for optional storage and retrieves it when requested by a recipient.—the storage being temporary or permanent.

Then, the server 509 sends a push notification to the recipient devices such as recipient mobile device 515. In response, the recipient mobile device 515 initiates the browsing of the AGAs starting with the first step of a multi-step activity. The server 509 sends the first segment of the AGA, which may comprise of a set of steps, to the recipient mobile device 515. In one embodiment, the browser in the recipient mobile device 515 determines that the client plugin should process the AGA and invoke it, passing the AGA to it for processing. The client plugin manages the subsequent processing of the steps in the AGA.

Figure 6:
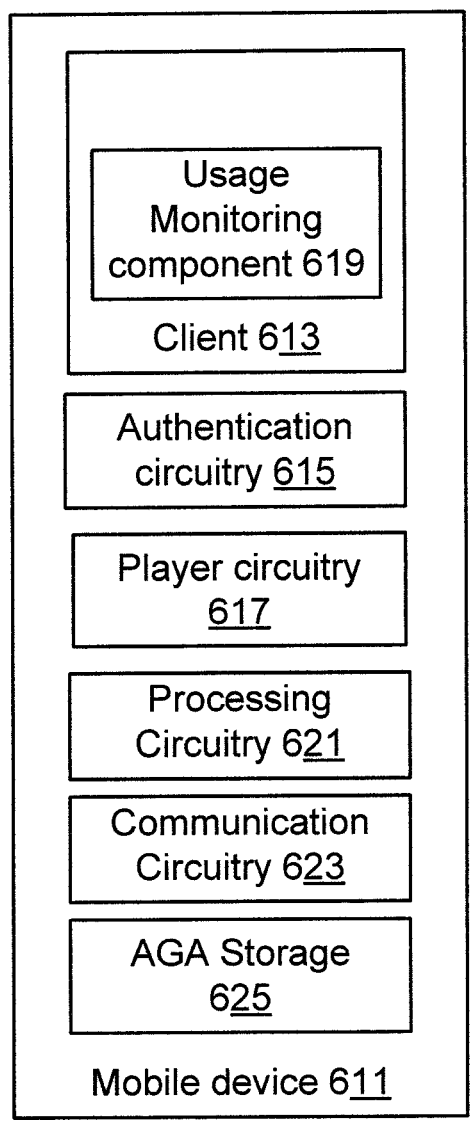
FIG. 6 is a schematic block diagram of a mobile device that supports presenting an activity guided activity (AGA) to a user.

FIG. 6 is a schematic block diagram of a mobile device 611 that supports presenting an activity guided activity (AGA) to a user. The mobile device 611 comprises a processing circuitry 621, an AGA storage 625 where the downloaded/received AGA is stored and managed, a communication circuitry 623 that facilitates AGA downloads, an authentication circuitry 615 that can be used for optional user and/or mobile device 611 authentication, and a player circuitry 617 that is used to play/render audio and/or video components of an AGA. In addition, it comprises a client component 613, that is capable of presenting an AGA to a user, gathering instructions from a user to move forward or step back across the AGA as it is being played, and responding to those user instructions. The client 613 comprises an usage monitoring component 619 that keeps track of the various AGAs that the user has accessed and reviewed, and reports on such usage as required.

Figure 7:
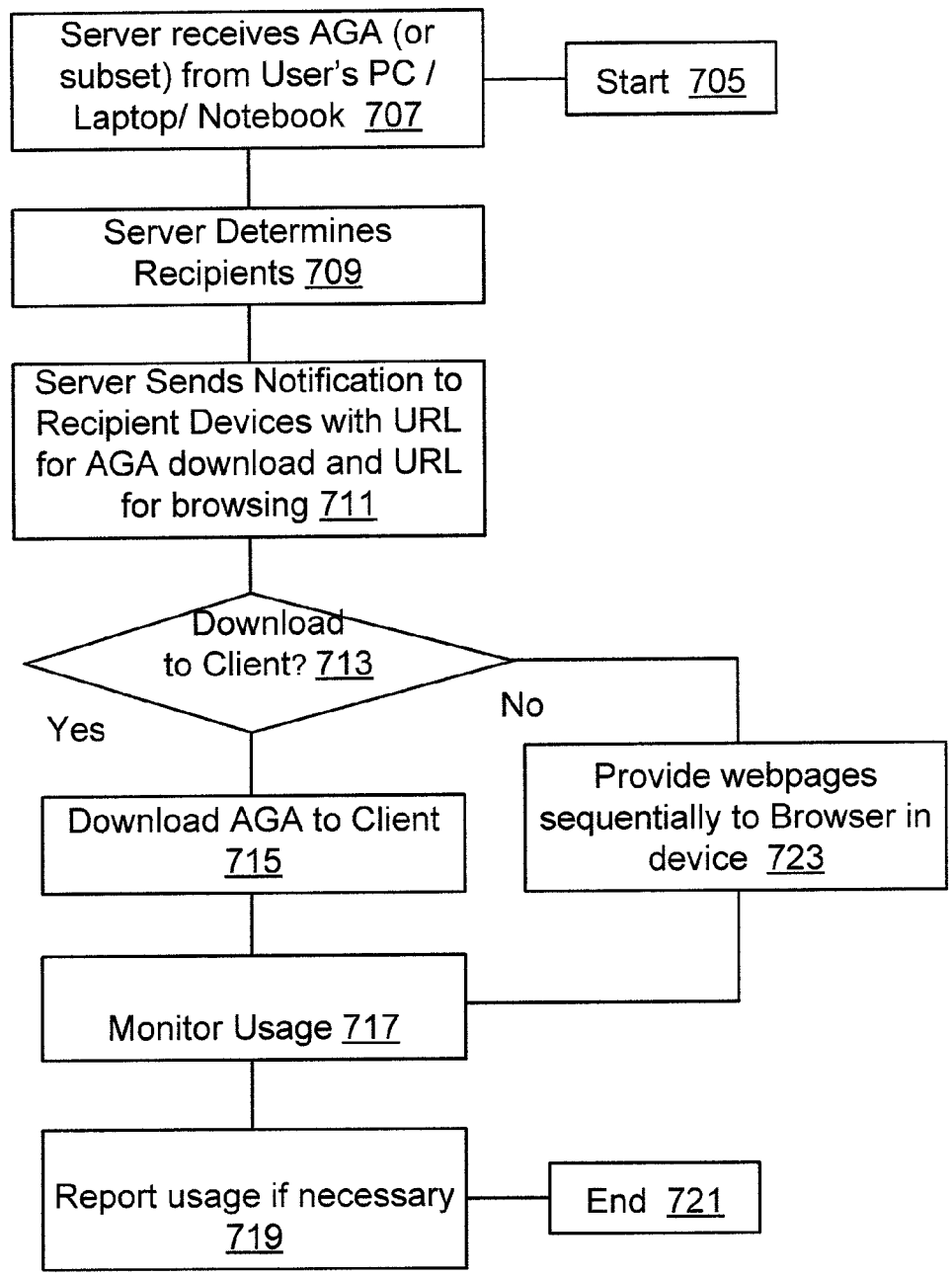
FIG. 7 is a flow chart of an exemplary operation of a server that receives, stores and disseminates AGAs to mobile devices.

FIG. 7 is a flow chart of an exemplary operation of a server that receives, stores and disseminates AGAs to mobile devices. At a start block 707, the server receives an AGA (or a subset of an AGA) from a user's PC/Laptop/computer where the user creates the AGA. At a next block 709, the server determines recipients for the AGA. In one embodiment, recipients are provided as a default list by a user, and reused on subsequent AGAs. In another embodiment, recipients sent along with an AGA are used instead of a default list of recipients already provided.

Then, at a next block 711, the server sends a notification, such as an SMS message, or an email, to a user of a mobile device or a PC, the user being one of the recipients. The notification to recipient devices comprises an URL from where the AGA can be downloaded. It also comprises (optionally) an URL where the AGA can be remotely browsed from a website, such a feature being useful for access from a mobile device or PC that does not have the necessary client component. Typically, the URL referencing the AGA points to a webpage or AGA content hosted by the server, although URLs for other websites may also be used.

At a next decision box 713, the server determines if a client exists in a mobile device/PC that can download an AGA and present it to the user. For example, the server can determines if the mobile device is ready to download an AGA from the server when the mobile device a notification and the server receives a response to the notification sent to the mobile device. If the server does determine that the client exists in the device and the client is ready, then, at a next block 715, the server facilitates download of the AGA to the client. Then, at a next block 717, the server monitors the usage by the client 717. Then, at a next block 719, the server reports usage by the mobile device/PC if necessary, such reporting being periodic, event based, etc. based on policies and preferences. Finally, at an end block 719 the processing terminates.

If, at the decision block 713, server does determine that the client does not exist or is not ready, then, at a next block 723, the server receives a request for webpages from the mobile device and provides webpages to the mobile device or PC where a browser, such as an HTTP based browser, receives and presents the AGA steps to the user. The server presents the webpages sequentially to the browser in the mobile device or PC. Then, at a next block, the server monitors usage and subsequently reports usage if necessary at a next block 719.

Figure 8:
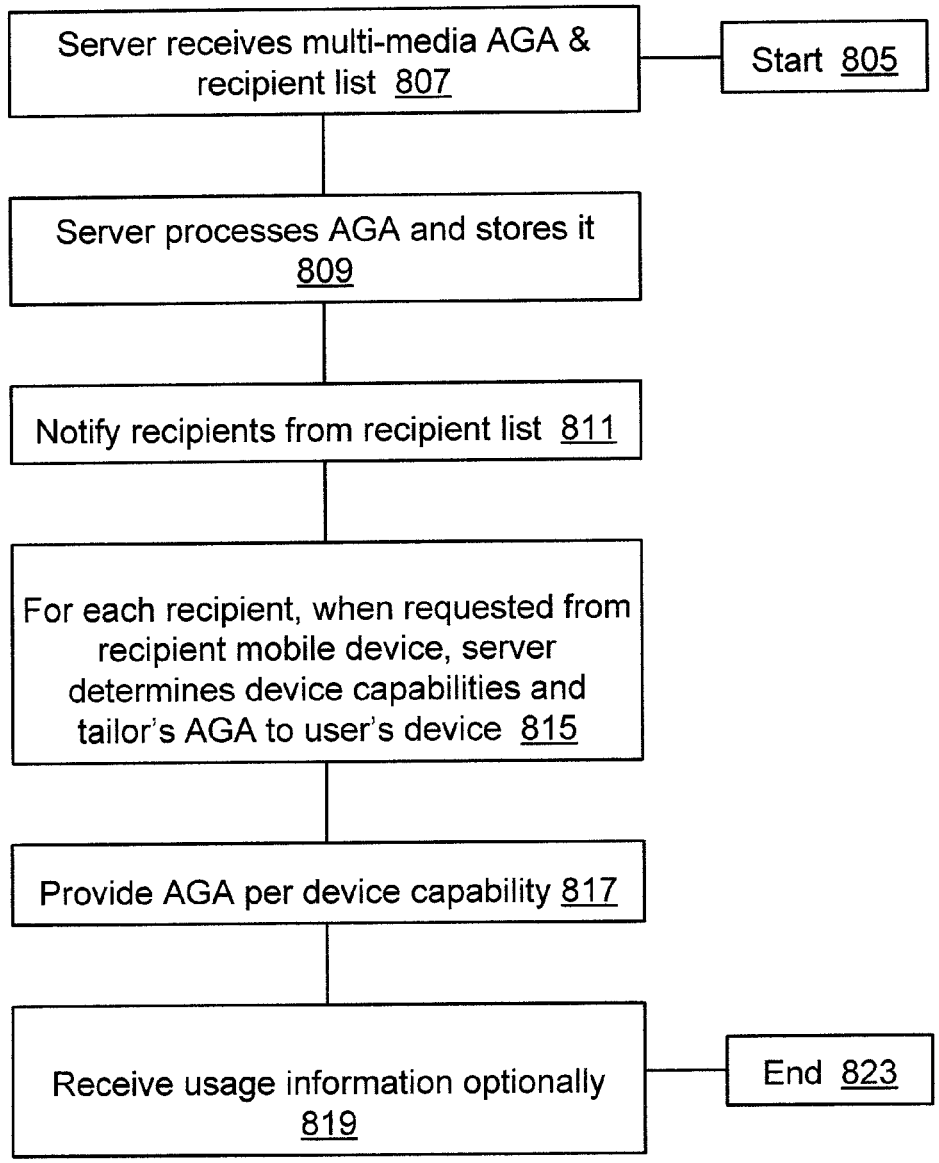
FIG. 8 is a flowchart of an exemplary operation of the server that facilitates tailored AGAs wherein the AGA is tailored based on device capabilities of the user's mobile device or PC.

FIG. 8 is a flowchart of an exemplary operation of the server that facilitates tailored AGAs wherein the AGA is tailored based on device capabilities of the user's mobile device or PC. At a start block 805, the server starts processing. Then, at a next block 807, the server receives a multi-media AGA and a recipient list from a sender's PC or computer. The sender might be the person who created the AGA, or another person responsible for creation and distribution of an AGA. The recipient-list can be a list of phone numbers, email addresses, IP addresses or a combination of these.

Then, at a next block 809, the server processes the AGA and stores it. For example, if the server has to insert a boilerplate text, pictures or boilerplate audio components to an AGA, it does it. This is done based on preferences and policies. At a next block 811, the server notifies recipients from the recipient list provided by user or setup as a default.

Then, at a next block 815, for each recipient in the recipient list, when the AGA is requested from the recipient mobile device or PC, the server determines corresponding device's capabilities and tailor's the AGA to the user's device. Tailoring involves reducing, shrinking or cropping images, reducing or eliminating audio content, etc. Then, at a next block 817, the server provides the tailored AGA per device capabilities. Then, at a next block 819, the server receives usage information and other statistics optionally sent by the client in the recipient mobile device or PC. Finally, processing terminates at an end block 823.

Figure 9:
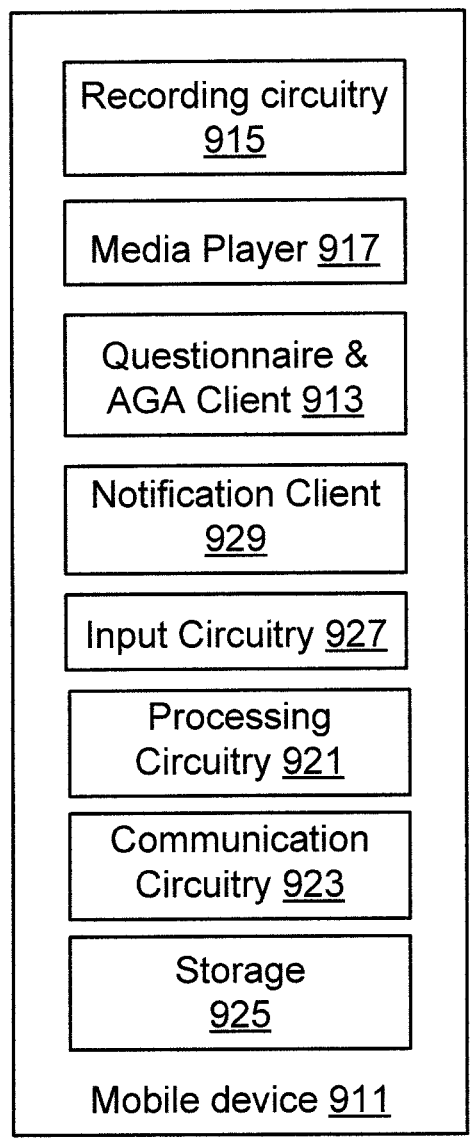
FIG. 9 is another schematic block diagram of a mobile device that supports presenting an activity guided activity (AGA) to a user.

FIG. 9 is another schematic block diagram of a mobile device 911 that supports presenting an activity guided activity (AGA) to a user. The mobile device 911 comprises a processing circuitry 921, a storage 925 where the downloaded/received AGA is stored and managed, and a communication circuitry 923 that facilitates AGA downloads. It also comprises a questionnaire and AGA client 913 that handles audio-guided questionnaires as well as audio guided activities, a media player circuitry 917 that is used to play/render audio and/or video components of an AGA or a questionnaire that may be currently presented to a user, and a notification client 929 that receives notifications for AGAs and questionnaires from a server distributing them. In addition, it comprises a recording circuitry 915 and input circuitry 927 that can be used by a user to create audio guided activities in an ad hoc manner using the mobile device 911.

In one embodiment, a user of the mobile device 911 can create adhoc audio guided activity with the help of the questionnaire and AGA client 913. The user employs the recording circuitry to record audio and/or video components that are incorporated into an AGA created by the user employing the questionnaire and AGA client 913. The user employs the input circuitry 927 to provide textual inputs that might be stored as textual preambles for the AGA. The questionnaire and AGA client 913 employs the communication circuitry 923 to send the adhoc AGA created in the mobile device 911 to a server with whom the mobile device is communicatively coupled.

Figure 10:
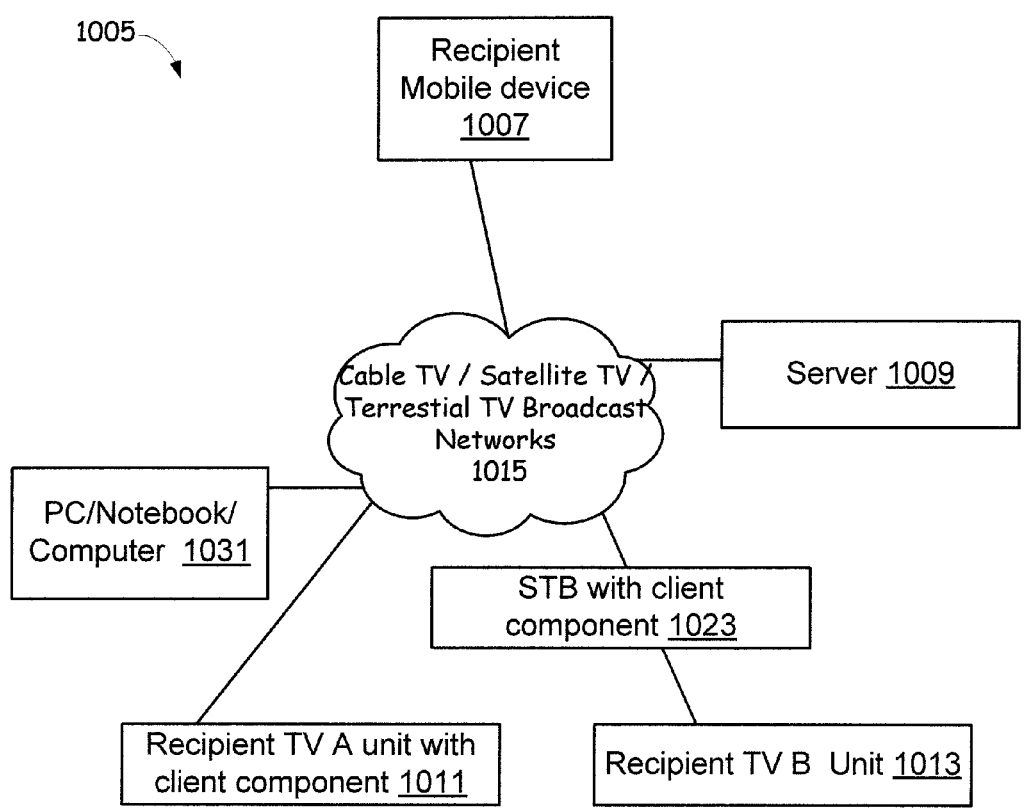
FIG. 10 is a perspective block diagram of a network wherein guided activities are provided to users such that a user can view them on their televisions.

FIG. 10 is a perspective block diagram of a network wherein guided activities are provided to users such that a user can view them on their televisions. A user creates guided activity using PC/Notebook/Computer and uploads it to a server 1009, or uses webpages provided by the server 1009 to create it. The user can uses or creates Video clips, graphics, audio, etc. to create guided activity. The server 1009 receives guided activity (including multi-media and videos) from user's PC/Notebook/computer 1031 and adds boilerplate content if needed. The server 1009 determines which recipient TVs 1011, 1013 need to receive the guided activity and forwards it. Optionally the server 1009 broadcasts the guided activity to all TVs and set-top-boxes (and mobile devices too).

The recipient TV A 1011 with the necessary client component receives the guided activity, lets the user browse through each step, and request additional details as supplementary information when the user requests them. In addition, the recipient TV B 1013 that does not have a client component uses a client component provided by a STB 1023 to receive and browse through the guided activity.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

The terms "audio preamble" and "voice preamble" as used herein may refer to recorded voice inputs that a user records, to provide a question/prompt in human language, that also selectively incorporates responses in multiple choice format to aid selection by a recipient. The audio preamble may be captured by a mobile device in MP3 format, AMR format, WMA format, etc.

The term "audio-assisted questionnaire" as used herein may refer to a questionnaire comprising audio portions, such as audio preambles, audio supplementary information, audio descriptions of multiple choices, etc. that make it possible for a recipient to listen to most of the information of the questions in a questionnaire (employing human voices, in audible form) without having to read all of that in a small screen of a mobile device, without requiring scrolling through textual descriptions on a limited/constrained device.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A mobile device communicatively coupled to a server based on communication needs, the mobile device comprising:
    at least one non-volatile memory having stored therein one or both of firmware and software;
    a communication circuitry;
    at least one processor operably coupled to the non-volatile memory and the communication circuitry, wherein the at least one processor, during operation, at least:
        receives and presents to a user of the mobile device instructions associated with an activity to be conducted by the user, wherein the instructions are provided as a multistep guided activity;
        presents interaction screens corresponding to specific steps of the multistep guided activity;
        receives user input associated with the steps of the multistep guided activity via the interaction screens;
        wherein the at least one processor presents supplementary information comprising additional multiple levels of details for any step of the multistep guided activity, when requested; and
        selectively advances to a subsequent step and to a corresponding subsequent screen, or reverts to a previous step and to a corresponding previous screen, of the multistep guided activity, in response to the user input;
    wherein each step of the multistep guided activity is retrieved one step at a time from a server in the network by the mobile device and presented to the user, wherein user interactions for that one step gathered by the recipient device is communicated back to the server upon completion of that one step.

2. The mobile device according to claim 1 wherein the at least one processor, during operation, further at least:
    supports browsing for multistep guided activities by the user; and
    retrieves multistep guided activities from the server based on one or more criteria, wherein the one or more criteria comprises user interests, user group affiliations, user membership information and device capabilities.

3. The mobile device according to claim 1 wherein the at least one processor, when it presents the steps, presents a corresponding textual information, an audio information and a graphics information for each of the steps of the multistep guided activity, and wherein the multistep guided activity comprises a sequence of steps necessary to configure a service, a machine, an electronic device or a vehicle.

4. The mobile device according to claim 1 wherein for each step of the multistep activity, a purpose of the current step with an overview of the current step, a step description regarding the current step in the activity and supplementary information is presented, wherein the supplementary information comprises additional details to help a user better understand the step, its benefits, alternate steps if any, and other detail to aid the user's comprehension of the related activity.

5. The mobile device according to claim 1 wherein for each step of the of the multistep activity, a minimal textual step description is provided designed to provide minimal necessary information for a user, and a supplementary information is provided for optional review by a user, wherein the supplementary information is in audio, textual, video and graphics forms, wherein the supplementary information is provided to aid user comprehension of the associated step in the multistep activity.

6. A method of creating and disseminating step by step instructions of a multistep activity in a network to a plurality of mobile devices, the method comprising:
    creating a multistep guided activity package comprising instructions associated with an activity to be conducted by the user;
    making different versions of the multistep guided activity package for communication to different types of mobile devices and users based on one or more criteria, wherein the one or more criteria comprises device capabilities, user group affiliations, membership information, user interests and user preferences;
    storing the different versions of the multistep guided activity package at a server;
    identifying target devices among the of the plurality of mobile devices; and
    communicating an appropriate version of the entire multistep guided activity to the target devices;
    wherein each step of the multistep guided activity is retrieved one step at a time from a server in the network by a recipient device and presented to the user, wherein user interactions for that one step gathered by the recipient device is communicated back to the server upon completion of that one step.

7. The method of claim 6, further comprising:
transferring a newly created multistep guided activity for distribution to a server, wherein the newly created multistep guided activity provides the steps necessary to diagnose and fix a problem with a machine, an electronic device or a vehicle, configure a device, configure a service, or work on a vehicle.

8. The method of claim 6 further comprising:
sending a notification regarding the availability of the multistep guided activity package to the target devices wherein the notification also comprises a link that can be activated to download a client component and install it before displaying the multistep guided activity;
wherein the multiple step activity package is packaged as an XML document comprising details for each step of the multistep activity, wherein the details are provided as a combination of an audio or video preamble, a textual step description, and supplementary information; and
wherein the audio or video preamble is played during the display of a corresponding step of the multistep guided activity and the supplementary information is provided upon user request.

9. The method of claim 6, the method further comprising:
billing for the creation of multistep guided activity packages and for the distribution of multiple step guided activity packages.

10. The method of claim 6 wherein the multistep guided activity is an activity comprising multiple levels of tasks and subtasks, each of the tasks and subtasks associated with a corresponding step of the multistep guided activity and comprising a corresponding level of preambles, description and supplementary information appropriate to that step in the activity.

11. The method of claim 6 wherein the multistep guided activity is a multistep process of executing an operation.

12. The method of claim 6 wherein the multistep guided activity package comprises, for each step, an audio or video preamble that provides a description of the corresponding step, an audio or video supplementary information that provides additional details of the corresponding steps of the multistep activity, and a textual step description for that step designed to provide minimal necessary information for that corresponding step to a user.

13. The method of claim 6 wherein the multistep guided activity package also comprises a coupon to be provided to a user at the end of the multistep guided activity or during the display of the multistep guided activity.

14. The method of claim 6 further comprising:
notifying the target devices with information regarding the availability of the multistep guided activity package, wherein the notification comprises a link to the multistep guided activity used by the recipient mobile device among the target devices to activate a browser to present the multistep guided activity, and wherein the notification also comprises with a second link that triggers a download of a client component necessary for display of the multistep guided activity locally in the recipient mobile device without the use of the browser.

15. The method of claim 6 wherein creating comprises:
specifying details of the activity to be conducted as a multistep collection of tasks, each task expressed as a set of subtasks;
defining each task and subtask as a step in the multistep guided activity;
packaging the multistep guided activity as an XML document; and
sending the XML document package of the multistep guided activity to a server for dissemination along with a list of recipients.

16. A server communicatively coupled to a mobile device based on communication needs, the server comprising:
a memory;
a communication circuitry;
at least one processor operably coupled to the memory and the communication circuitry, wherein the at least one processor, during operation, at least:
receives and sends to the mobile device instructions associated with an activity to be conducted by a user, wherein the instructions are provided as a multistep guided activity;
tracks creation and dissemination of the multistep guided activity for billing purposes;
receives user input associated with the steps of the multistep guided activity;
selectively provides content for a subsequent step or for a previous step of the multistep guided activity, in response to the user input, if the mobile device is only capable of browser based interactions;
wherein the at least one processor provides supplementary information comprising additional details for any step of the multistep guided activity that helps a user better understand the step, its benefits, alternate steps if any, and any other details that aid the user's comprehension of the related activity; and
wherein the at least one processor provides the multistep guided activity as a package comprising, for each step of the multistep guided activity, a purpose description of the current step with an overview of the current step, a step description regarding the current step in the activity, and the supplementary information.

17. The server of claim 16, wherein the at least one processor disseminates the multistep guided activity to a plurality of mobile devices, wherein the multistep guided activity comprises a sequence of steps necessary to configure a service, a machine, an electronic device or a vehicle.

18. The server of claim 16 wherein for each step of the of the multistep activity, a minimal textual step description is provided that is designed to provide minimal necessary information to a user, and a supplementary information for optional review by the user, wherein the supplementary information is in audio, textual, video and graphics forms.

* * * * *